US012208819B1

(12) United States Patent
Funke et al.

(10) Patent No.: US 12,208,819 B1
(45) Date of Patent: Jan. 28, 2025

(54) AUTONOMOUS DRIVING OBJECT DETECTION AND AVOIDANCE

(71) Applicant: Zoox, Inc., Foster City, CA (US)

(72) Inventors: Joseph Funke, Redwood City, CA (US); Steven Cheng Qian, San Francisco, CA (US); Kazuhide Okamoto, Mountain View, CA (US); Jacob Patrick Thalman, San Francisco, CA (US); Sriram Narayanan, San Jose, CA (US); Yunpeng Pan, Newark, CA (US)

(73) Assignee: Zoox, Inc., Foster City, CA (US)

( * ) Notice: Subject to any disclaimer, the term of this patent is extended or adjusted under 35 U.S.C. 154(b) by 258 days.

(21) Appl. No.: 17/589,528

(22) Filed: Jan. 31, 2022

(51) Int. Cl.
*B60W 60/00* (2020.01)
*B60W 30/09* (2012.01)
*B60W 30/095* (2012.01)

(52) U.S. Cl.
CPC ........ *B60W 60/0011* (2020.02); *B60W 30/09* (2013.01); *B60W 30/0956* (2013.01); *B60W 60/0015* (2020.02); *B60W 60/00274* (2020.02)

(58) Field of Classification Search
CPC ............. B60W 60/0011; B60W 30/09; B60W 30/0956; B60W 40/04; B60W 60/0015; B60W 60/00274; B60W 60/0021; B60W 30/18163; G06V 20/58; G01C 21/3453; G01C 21/3415; G05D 1/0214; G05D 1/0212; G05D 1/0088
See application file for complete search history.

(56) References Cited

U.S. PATENT DOCUMENTS

| | | | |
|---|---|---|---|
| 2019/0270447 A1* | 9/2019 | Tsuchiya | G08G 1/165 |
| 2021/0108936 A1* | 4/2021 | Seegmiller | B60W 60/00276 |
| 2021/0354725 A1* | 11/2021 | King | B60W 30/10 |

* cited by examiner

*Primary Examiner* — Bao Long T Nguyen
(74) *Attorney, Agent, or Firm* — Lee & Hayes, P.C.

(57) ABSTRACT

This disclosure describes techniques for autonomous vehicles to determine driving paths and associated trajectories through unstructured or off-route driving environments. When an object is detected within a driving environment, a vehicle may determine a cost-based side association for the object. Various costs may be used in different examples, including costs based on a cost plot and/or motion primitives that may vary for terminal and non-terminal desired destinations (or ending vehicle states). Using tree searches to determine estimated candidate costs, the autonomous vehicle may compare right-side and left-side driving path costs around the object to determine a side association for the object. Based on the side association, the autonomous vehicle may determine an updated planning corridor and/or a trajectory to control the vehicle from a current state to a desired ending vehicle state.

20 Claims, 10 Drawing Sheets

Cost Plot 500

Cost Plot 502

AUTONOMOUS DRIVING OBJECT DETECTION AND AVOIDANCE

BACKGROUND

Autonomous vehicles may include computing systems configured to navigate along designated routes from an initial location toward a destination. An autonomous vehicle may utilize various systems and components to traverse through environments including various static and dynamic objects, including moving and stationary vehicles (autonomous or otherwise), people, buildings, and other objects. When traversing through such environments, autonomous vehicles may rely on various roadway indicators such as lane markings, traffic signs and signals, and/or map data to navigate the environment. However, an autonomous vehicle may fail to navigate accurately or efficiently when such indicators are absent (e.g., within parking lots or other off-route regions, etc.), are obscured (e.g., by snow, garbage, sand, etc.), degraded (e.g., a burned-out light, worn-out lane markings, etc.), and/or invalidated (e.g., by obstacles partially blocking a lane, traffic signs or traffic cones indicating alternate lanes, etc.). The lack of visible and reliable roadway indicators can present challenges for autonomous vehicles to safely and comfortably traverse through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
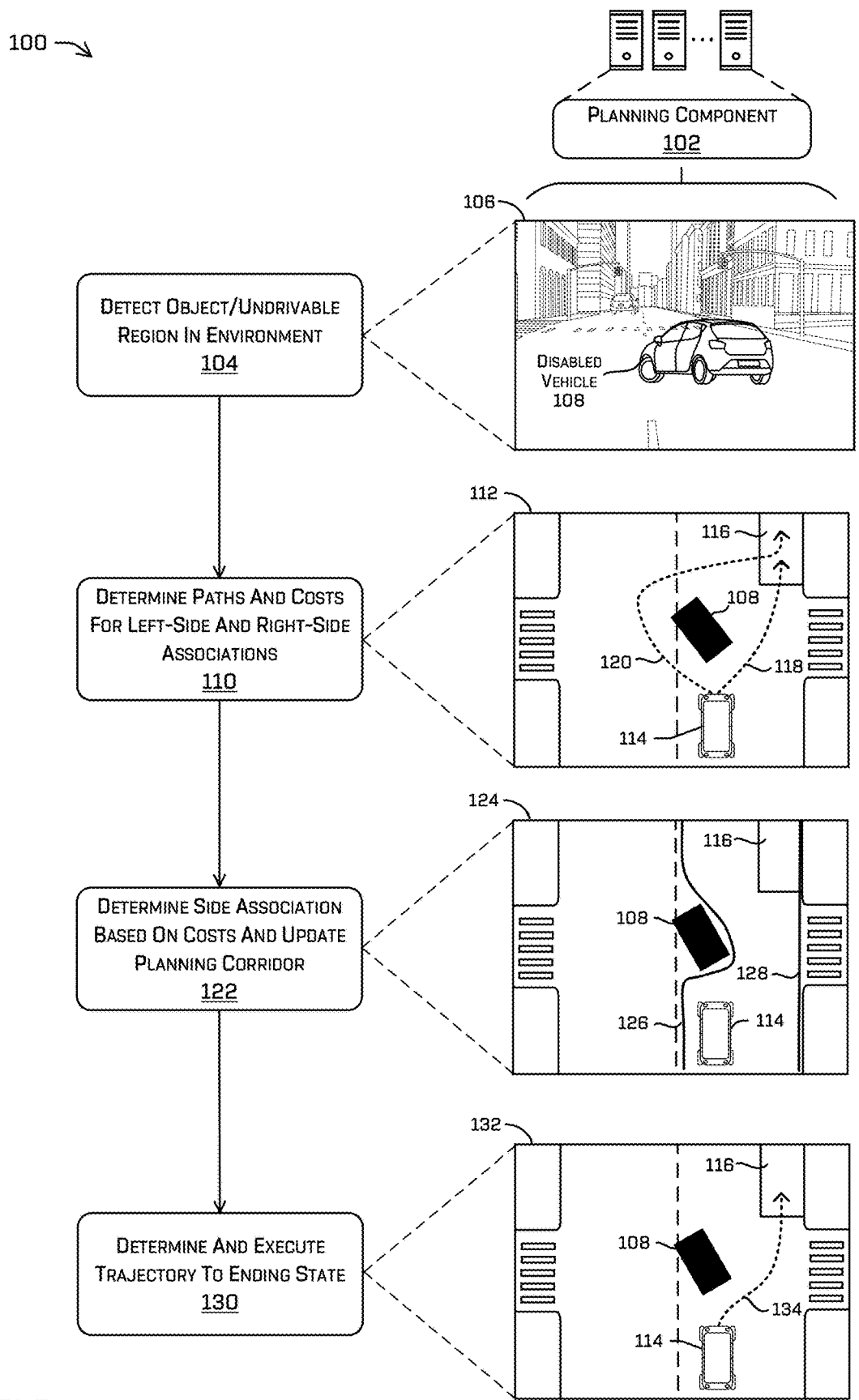
FIG. 1 is a pictorial flow diagram illustrating an example technique for determining a cost-based approach for determining which side of an object in an environment should be used when planning a path (side association), and using the side association to determine a trajectory to an ending vehicle state, in accordance with one or more examples of the disclosure.

This disclosure describes techniques for an autonomous vehicle to detect and avoid objects and/or other undrivable regions in an environment, by determining a side association that can be used when planning a trajectory to navigate around the object in the environment. As described below in more detail, a side association for the object/region may be used to determine on which side of the object/region the vehicle should pass when planning a trajectory. In some examples, the vehicle may use a side association for an object or undrivable region to determine an updated planning corridor, which may define a homotopy class that can be used to determine a trajectory for the vehicle to traverse the environment to a desired destination state.

Thus, certain techniques described herein include determining a side association for an object or other undrivable region based on costs associated with driving paths to the left and right of the object or region. Additional techniques may include, after determining a side association for an object or region, using the side association to determine an updated planning corridor and/or updated vehicle trajectory to navigate around the object/region to a desired ending vehicle state. Certain examples described herein may apply to unstructured driving environments, and/or to performing off-route driving maneuvers within structured or unstructured environments. In some examples, when a vehicle detects an object (e.g., a static object, dynamic object, or other undrivable region) within an environment, the vehicle may determine a cost-based side association for the object. In some examples, one or more search algorithms and/or cost-based optimization techniques may be used to determine an optimal or lowest cost driving path between the starting state and a desired ending state of the vehicle. Whether the driving path is a path passing on the left or the right of the object may be used determine the side association for the object. Various different costs may be applied in different scenarios, including costs based on a cost plot and/or motion primitives that may vary for terminal and non-terminal ending vehicle states. For instance, for a driving route having a terminal ending state, such as parking, pulling over, or going in reverse, the vehicle may use a cost plot defining a set of cost values for moving the vehicle from a range of positions and orientations to a desired target state. In some cases, the vehicle may use tree searches and/or other cost-based searching techniques to determine alternative right-side and left-side driving paths around the object, and to determine an associated cost for each driving path. Based on the costs, the vehicle may determine a side association (e.g., a right-side association or a left-side association) for the object. Based on the side association for the object, the vehicle may determine an updated planning corridor used to determine a trajectory for the vehicle to navigate within the environment from the current vehicle state to the desired ending vehicle state.

To navigate a driving environment, an autonomous vehicle may use various sensors to capture sensor data (e.g., image or video data, radar data, lidar data, sonar data, etc.) of the surrounding environment. The vehicle may analyze the sensor data to detect and classify various objects in the environment. Objects encountered by an autonomous vehicle may include other dynamic objects that are capable of movement (e.g., vehicles, motorcycles, bicycles, pedestrians, animals, etc.) and/or static objects (e.g., buildings, road surfaces, trees, signs, barriers, parked or disabled vehicles, debris, etc.). In some cases, the autonomous vehicle may detect an object or a potential object in the environment, but may be unable to determine the presence, precise boundaries, and/or classification of the object with a sufficient degree of confidence. In such cases, the vehicle may classify the object or potential object as an undrivable region that should be avoided by the vehicle while navigating the environment. As used herein, an object may refer to a static object, a dynamic object, or an otherwise undrivable region detected by the vehicle in the environment.

In order to safely and efficiently traverse the driving environment, the autonomous vehicle may include components configured to analyze the attributes of any detected objects, and determine trajectories for the vehicle based on the objects. For example, perception, prediction, and planning components within an autonomous vehicle may execute any number of trained models and/or other subcomponents configured to detect and classify objects based on the sensor data (e.g., segmentation, classification, tracking, etc.), predict future movements routes or trajectories of dynamic objects, and/or determine trajectories through the environment based on the analysis of the static and dynamic objects. For instance, perception and/or prediction components of an autonomous may analyze various modalities of sensor data to classify objects into static or dynamic object types, and may determine object attributes and predict object behaviors based on the classification and other object attributes.

Autonomous vehicles may operate in various driving environments, including environments with route-based reference systems and off-route environments. A route-based reference system may include a coordinate frame and designated routes based on one or more maps of an environment. When navigating in route-based reference systems, a vehicle may use localization component and maps modeled in two or more dimensions that provide information about the environment, such as topologies (such as intersections), streets, roads, terrain, and the environment in general. To navigate such environments, the vehicle also may use any roadway indicators detected in the environment, such as lane markings, traffic signs and signals, etc. A vehicle navigating in accordance with a route-based reference system may follow a route-based trajectory toward its destination, and may perform route-based actions such as continuing straight along a route, executing lane changes, merging or turning onto different roads, and the like.

However, some driving environments in which a vehicle may operate are not associated with route-based reference systems and/or are not suitable for route-based actions and trajectories. For example, parking lots, school or corporate campuses, and/or other private road systems might not be included in any route-based reference system(s) available to the autonomous vehicle. Additionally, construction projects, road damage and/or vehicle accidents might alter route-based reference systems by closing lanes, diverting traffic, etc. In these environments, vehicles may determine off-route driving maneuvers and/or off-route trajectories that do not correspond to designated roads or other throughways defined by a route system. Examples of off-route trajectories may include navigation routes between starting and ending positions within parking lots, driving maneuvers for parking a vehicle, pulling over, going in reverse, etc.

In some examples, vehicles may perform off-route driving maneuvers and/or off-route trajectories based on or in the proximity of objects detected within the driving environment. For instance, an object in a roadway partially blocking a lane (or other potential driving path) may require the vehicle to determine and execute an off-route trajectory to navigate around the object before continuing toward its intended destination. To perform an off-route trajectory around or near an object, the vehicle initially may determine a side association for the object relative to the driving environment. A side association determination may identify the side of an object (e.g., an obstacle or other object) around which the vehicle may pass to proceed to its intended destination. A right-side side association for an object may include determining that the object should be associated (e.g., integrated into) a right-side surface of a planning corridor used by the vehicle to navigate the environment. As a result, as described below, a right-side side association for an object may correspond to a determination that the vehicle may pass on the left side of the object. In contrast, a left-side side association for an object may include determining that the object should be associated (e.g., integrated into) a left-side surface of the planning corridor used by the vehicle, and thus the vehicle may pass on the right side of the object.

Side associations of objects in an environment may be used to update the planning corridor used by the vehicle to navigate the environment to its intended destination. In some examples, an initial planning corridor may be determined by a planning component of an autonomous vehicle, based at least in part on the width of the autonomous vehicle and/or the perception data received from the perception component associated with the driving. In such examples, the autonomous vehicle may use the planning corridor to bound potential trajectories generated by the perception component and/or selected by the planning component for operating the autonomous vehicle. For instance, a planning component may analyze and/or select a potential trajectory based at least in part on determining that no portion of the potential trajectory (or associated portion of the vehicle when following such a potential trajectory) lies outside the current planning corridor for the vehicle. In some instances, the planning corridor may indicate at least a portion of a drivable surface that is free of other objects. The planning corridor may additionally or alternatively be based at least in part on the width of the vehicle and/or tolerances (e.g., safety buffers) associated with operating the autonomous vehicle.

When a side association is performed for an object detected in the environment, the vehicle may determine a right-side or left-side side association for the object, and may update the planning corridor for the vehicle by associating the object with one side of the current planning corridor. The updated planning corridor thus may be smaller (e.g., and narrower) than the previous planning corridor, and may exclude any potential trajectories in which the vehicle passes the object on the "associated" side of the object. For instance, if a left-side association is determined for an object, the resulting planning corridor may preclude any trajectories in which the vehicle passes on the left of the object, and vice versa. Thus, side association of objects may provide the vehicle with techniques for quickly modifying planning corridors on-the-fly while navigating an environment, which may allow the vehicle to safely and efficiently determine off-route driving trajectories that can be used to navigate around objects detected in the environment.

A number of technical challenges exist with determining and using side associations of objects to determine trajectories for autonomous vehicles. For instance, certain techniques may determine a side association for an object based on which side association will result in the largest planning corridor for the vehicle, and/or which side association will result in the planning corridor closest to the current position or trajectory of the vehicle. However, the largest and closest planning corridors to the vehicle may not be the safest and/or most efficient way for the vehicle to navigate the environment. When the vehicle selects a wrong (or suboptimal) side determination, the resulting planning corridor and possible trajectories through the planning corridor may be less safe and/or less efficient trajectories for the vehicle. Thus, determining side association based on simple metrics such as the planning corridor size and proximity of the planning corridor to the vehicle may result in suboptimal trajectories that can affect vehicle and passenger safety and driving efficiency.

In contrast, determining the right (or optimal) side association for an object to a high degree of certainty can be a difficult computational task requiring a significant amount of time and computing resources. For example, trajectory determination and optimization can be a complex and difficult computing task. As a result, side association determinations that involve determining optimal trajectories for the vehicle around one or both sides of the object, can impose significant processing load on the vehicle resulting in less efficient operation and potential vehicle navigation delays. Further, as the vehicle approaches or circumvents an object, the vehicle may continue to determine side associations for the object continuously or periodically (e.g., an updated side association at each output cycle of the planning component). Performing repeated side association determinations may use significant computing resources, and potentially may result in jitter when different side associations and/or different planning corridors are determined in different iterations as the vehicle approaches the object.

To address the technical challenges associated with determining side associations for objects and using the side associations to execute trajectories for autonomous vehicles, the techniques described herein include efficient cost-based determinations of side associations for objects. As described in more detail below, a planning component of an autonomous vehicle may efficiently determine right-side and left-side driving paths and corresponding path costs. In various examples, the planning component may perform a tree search with costs-based optimization to determine a driving path on each side of the object. For instance, to determine a driving path around an object, the planning component may use occupancy maps to determine and sample a grid comprising spaced layers, from a starting vehicle state to an ending vehicle state. Various multi-factor cost functions and/or other cost optimization techniques may be used to determine the potential driving paths around the left side and right side of the object.

Any number of different cost types may be applied in various examples, including kinematic costs, motion primitive costs, heuristic costs (e.g., based on a cost plot), and/or various other costs described herein. In some examples, different sets of costs may be used to determine side association driving paths, based on attributes associated with the vehicle, passengers, starring or ending vehicle states, etc. For instance, when the planning component determines that the ending vehicle state is a terminal state (e.g., a parking space, pull over target location, reverse action target location, etc.), then the planning component may apply one set of costs (e.g., including heuristic costs based on a cost plot) to evaluate the costs of side association driving path. In contrast, when the planning component determines that the ending vehicle state is a non-terminal state (e.g., an intermediate or continuing point along a route to another destination), then the planning component may apply a different set of costs (e.g., executing heuristic costs) the evaluate the association driving path.

In some examples, to address the potential problem of jitter caused by opposing side association determinations as the vehicle approaches the object, certain techniques described herein may implement a latching feature that locks in a side association determination to a particular side and does not permit the side association to be changed unless specific criteria are met. In certain latching features, after a first side association is determined (e.g., right side) for an object, a subsequent second side association determination (e.g., left side) for the object may be disregarded when the time difference (or time duration) between the first and second side associations is less than a minimum time threshold. Additionally or alternatively, the vehicle may be configured in some cases to retain the side association for an object indefinitely, or until the current vehicle trajectory indicates a potential collision with the object, or the current planning corridor of the vehicle is blocked, at which time a new side association determination may be performed for the object.

As described in more detail, by using an efficient and cost-based driving path determination to select the side association for an object, the autonomous vehicle may determine improved off-route trajectories that allow the vehicle to more safely and efficiently navigate around objects in the environment. For example, after determining a side association for an object based on the cost comparison of the right-side/left-side driving paths, the vehicle may use the side association to determine an updated planning corridor that defines the homotopy class of possible trajectories for the vehicle. In some instances, the driving paths described herein for determining side associations may be generated and evaluated much more quickly and using fewer computing resources than the corresponding techniques for generating and optimizing vehicle trajectories. As a result, cost comparisons between driving paths may be used to determine a side association quickly and efficiently, after which the vehicle may use the resulting homotopy class defined by the side association to generate and optimize a trajectory through the planning corridor.

Additionally, the techniques described herein can improve the generation of off-route trajectories and/or other off-route driving maneuvers in unstructured driving environments. For instance, by applying different cost functions and/or metrics to different driving scenarios (e.g., parking versus continuing through an environment), the planning component may determine improved side associations for the various driving scenarios. As an example, within a driving environment, a right-side association may result in a more optimal planning corridor and trajectories when the ending vehicle state is a terminal state (e.g., parking, pulling over, reversing, etc.). In this example, in the same driving environment, a left-side association may result in a more optimal planning corridor and trajectories when the ending vehicle state is a non-terminal state.

As described in the examples herein, a trajectory generated and/or optimized by for a vehicle (e.g., by a trajectory generator component), may be different from the driving paths determined (e.g., by the side association component) to determine a side association for an object/region. For instance, a trajectory generated by a trajectory generation component may represent a feasible and complete driving route that the vehicle is capable of following to traverse the environment. In some cases, a trajectory may include a sequence of waypoints and corresponding vehicle control instructions to guide the vehicle from its current state to the desired ending state. In contrast, the driving paths determined by the side association component might not be complete or feasible driving routes that the vehicle is capable of performing. For instance, the side association component may determine left-side and/or right-side driving paths for side association determinations, using a sampled grid from an occupancy map comprising spaced layers, or other low-cost and/or coarse search techniques. As an example, the driving paths generated by the side association component might not include waypoints or corresponding vehicle control instructions, and may represent infeasible routes that the vehicle is physically incapable of following. However, generating a more detailed, feasible, and optimized trajectory based on a planning corridor may be a complex and computationally expensive task. In contrast, a driving path such as those described below in FIG. 3 may be based on a relatively coarse analysis of the environment (e.g., using connecting nodes within spaced layers). As a result, generating and comparing costs associated with any number of possible driving paths can be performed in a relatively quick and computationally inexpensive manner compared with trajectory generation. Therefore, using a side association component to generate and compare costs of various driving paths, and to determine a side association for an object based on the driving path costs, may provide more efficient and accurate side association determinations for objects/regions. In at least some examples where multiple objects or regions impede the vehicle from progressing along a route, side association may be used to identify the general path through which to move and a resultant corridor may be generated by expanding laterally from the resultant path to any objects or regions. Then, after using the efficient techniques described herein to determine a side association for an object, the planning corridor may be updated and narrowed based on the side association, and a trajectory generator may determine a more detailed and feasible vehicle trajectory within the updated planning corridor.

As illustrated by these examples, the techniques described herein can improve the functioning, safety, and efficiency of autonomous and semi-autonomous vehicles traversing through driving environments. By using an efficient, cost-based side association determination for objects, the planning component can determine improved trajectories that allow the vehicle to traverse the environment safely and efficiently. The features and functionality described herein thus improve vehicle safety by preventing potential collisions and avoiding dangerous driving maneuvers (e.g., emergency stopping or swerving) when the vehicle performs off-route maneuvers and off-route trajectories to navigate around objects in the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc.

FIG. 1 depicts an example process 100 for determining a cost-based side association for an object in an environment, and using the side association to determine a trajectory for the vehicle to navigate the environment. In various examples, some or all of the operations in process 100 may be performed by a planning component 102 within an autonomous or semi-autonomous. As described in more detail below, the planning component 102 may include subcomponents and/or specific functionality to determine side associations for objects based on costs of right-side and left-side driving paths around the object, and to determine an updated planning corridor and/or trajectory for the vehicle based on the side association.

At operation 104, the planning component 102 may detect an object within the environment of the autonomous vehicle (which may be dynamic—e.g., capable of moving though stopped and/or static—e.g., fixed or not moving). For example, box 106 illustrates a driving scene in which a vehicle is traversing a driving environment and approaching an object partially blocking the lane in which the vehicle is driving. In this example, the object is a disabled vehicle 108; however, in other examples an object may include any object not capable of movement (and/or stationary dynamic objects). In various examples, the vehicle may include a perception component configured to capture and analyze various sensor data (e.g., image or video data, radar data, lidar data, sonar data, etc.). In such examples, the perception component may detect and classify the object based on the sensor data, and may provide the object data, classification, and/or other attributes to the planning component 102.

As shown in this example, the driving environment of the vehicle may be a structured (or on-route) driving environment, in which the vehicle may use roadway indicators and/or map data (at least in part) to determine trajectories for the vehicle to traverse the environment. However, the disabled vehicle 108 in this example is blocking a lane, which may require the vehicle to determine and execute an off-route trajectory to circumvent the disabled vehicle 108 and continue to navigate toward the intended destination of the vehicle. In other examples, the vehicle may operate in off-route environments such as parking lots, and may At operation 110, the planning component 102 may determine one or more driving paths and associated costs for determining a side association for the disabled vehicle. Box 112 illustrates an overhead view of the same driving scene shown in box 106. In this example, the vehicle 114 associated with the planning component 102 is shown in the overhead view, along with the intended destination 116 of the vehicle 114 and the disabled vehicle 108. As described in more detail below, the planning component 102 may use the current vehicle state of the vehicle 114 (e.g., a reference pose), and the intended destination 116 of the vehicle 114 (e.g., a target pose), to determine right-side and left-side driving paths around the disabled vehicle 108. In some examples, the current vehicle state and intended destination state of the vehicle 114 may include not only the starting and ending positions of the vehicle 114, but also the starting and ending orientations, poses, velocities, accelerations, and/or other vehicle attributes associated with the starting state of the vehicle 114 and ending state at the intended destination 116.

In various examples, the intended destination 116 may represent a terminal ending state or a non-terminal ending state. A terminal ending state for the vehicle 114 may refer to an ending state at which the vehicle intends to stop. For instance, if the intended destination 116 is a parking spot, a location at which the vehicle 114 intends to pull over and pick up or drop off passengers, or a location at which the vehicle 114 to stop and reverse, then the intended destination 116 may be a terminal ending state. In contrast, if the vehicle 114 does not intend to stop at the intended destination 116, but rather intends to drives through the intended destination 116 as an intermediate or continuing point to another destination, then the intended destination 116 of the vehicle 114 may be referred to as a non-terminal vehicle ending state.

To determine a side association for the disabled vehicle 108, the planning component 102 initially may use various searching and/or cost-optimization techniques to determine one or more driving paths between the current state (e.g., position and orientation) of the vehicle 114 and the intended destination 116 (e.g., position and orientation) of the vehicle 114. In this example, the planning component 102 has determined a right-side driving path 118 and a separate left-side driving path 120. As described below, the planning component 102 may use various cost-based path searching techniques to determine and evaluate various possible driving paths. For instance, the planning component 102 may perform a tree search technique, using path costs and/or candidate action costs, to determine one or more optimal and/or lowest-cost driving path around the disabled vehicle 108. In some case, a search technique may generate multiple end-to-end driving paths between the current state and the intended destination of the vehicle 114, and may compare the respective costs associated with each path to determine a lowest-cost and/or optimal path. As shown in this example, one end-to-end path may be a right-side driving path 118 and another end-to-end path may be a left-side driving path 120. In other examples, the search algorithms used by the planning component 102 may determine a single lowest cost end-to-end path by analyzing the costs associated with individual path segments (or connections). For instance, a tree search or other cost-based search algorithm may construct a lowest-cost driving path by determining sequence of connections between the current state and intended destination of the vehicle (which, in at least some examples, may be a combination of a cost to come and a cost to go when generating the nodes). Such determinations may be made in accordance with those techniques described in U.S. patent application Ser. No. 16/517,506 entitled "Unstructured Path Planner" filed on Jul. 19, 2019, the entire contents of which are incorporated herein. Of course, lower cost and/or lower computational resources than those described may be used as well and/or in addition. At each connection in the sequence, the planning component 102 may determine and evaluate the costs for each of multiple possible candidate actions at the connection (e.g., kinematic costs, proximity costs, distance to ending state costs, etc.), to select the next connection toward to the intended destination 116.

In some examples, the planning component 102 may use a sampled grid, determined based on an occupancy map of the environment, and including spaced layers, to determine possible (and/or optimal) right-side and left-side driving paths relative to the object. Additional examples and further description of various techniques for determining driving paths to circumvent objects in an environment can be found, for example, in U.S. Patent Application Pub. 2021/0347382, filed on May 11, 2020, and titled, "Unstructured Vehicle Path Planner," which is incorporated by reference herein in its entirety for all purposes.

Additionally or alternatively, the planning component 102 may perform one or more tree search techniques to determine and evaluate the potential driving paths around an object in an environment. For example, the planning component 102 may include a side association component configured to perform any number of tree search techniques, such as determining side association of objects by alternately determining a candidate action and predicting a future state based on that candidate action. Additional tree search techniques may include determining costs associated with candidate actions (including estimations of transition costs from a current or former state to a next state of the vehicle 114), determining cost estimates based on alternately applying lower a bound cost and an upper bound cost, and/or predicting the future states of the vehicle 114 based on an ML model classifications of dynamic objects as being reactive objects or passive objects. Additional examples and further description of determining driving paths (and/or trajectories) using tree search techniques can be found, for example, in U.S. patent application Ser. No. 17/394,334, filed on Aug. 4, 2021, and titled, "Vehicle Trajectory Control Using A Tree Search," which is incorporated by reference herein in its entirety for all purposes.

In some examples, the planning component 102 may analyze the right-side driving path 118 and the left-side driving path 120 to determine costs associated with both driving paths. The costs associated with a driving path(s) 118 and 120 may include, for example, vehicle proximity cost(s), vehicle safety cost(s), vehicle comfort cost(s), and/or vehicle progress cost(s), each of which are described below in more detail. The planning component 102 may determine costs associated with the driving path(s) 118 and 120, and may compare the costs of the driving path(s) to determine a side association for the disabled vehicle 108. Additionally, in some examples, the planning component 102 may determine and apply different costs (or sets of costs) to determine driving path costs for the right-side and left-side driving paths. For instance, in some cases, when the planning component 102 determines that the ending vehicle state (e.g., intended destination 116) is a terminal state, it may determine and apply a first set of costs which may include heuristic costs based on a cost plot for terminal ending vehicle states. In other cases, when the planning component 102 determines that the ending vehicle state (e.g., intended destination 116) is a non-terminal state, it may determine and apply a second set of costs (e.g., not including heuristic costs) for non-terminal ending vehicle states.

At operation 122, the planning component 102 may determine a side association for the disabled vehicle 108, based on the costs associated with the right-side and left-side driving paths 118 and 120. In some cases, the planning component 102 may compare one or more costs associated with the right-side driving path 118 to the corresponding costs associated with the left-side driving path 120, and may determine the side association for the disabled vehicle 108 based on a lowest cost driving path. Additionally, at operation 122 the planning component 102 may determine an updated planning corridor for the vehicle 114, based on the side association. As shown in box 124, the planning component 110 has determined a left side association for the disabled vehicle 108, for example, based on a determination that the right-side driving path 118 has a lower cost metric than the left-side driving path 120. As a non-limiting example, and as illustrated, such a metric may be indicative of a complexity of the maneuvers (which may be expressed as an overall amount of energy, time, number of controls, etc.) when following path 118 may be less than when following path 120 to end in the desired terminal state. As a result of the side association, the planning component 102 may update the planning corridor used by the vehicle 114 to exclude the disabled vehicle 108. As shown in this example, the boundary lines 126 and 128 defining the planning corridor for the vehicle 114 have been changed to exclude disabled vehicle 108 from the planning corridor based on a left-side association of the disabled vehicle 108.

At operation 130, the planning component 102 may determine and execute a trajectory for the vehicle 114. As shown in box 132, the trajectory 134 determined for the vehicle 114 may be a feasible and/or optimized trajectory (e.g., determined by a trajectory generator), that complies with the side association of the disabled vehicle 108 and stays within the updated planning corridor.

As described below in more detail, the trajectory 134 may be different from the right-side driving path 118, although both the trajectory 134 and right-side driving path 118 may have similar starting and ending vehicle states. However, in some examples, the driving paths generated for use in side association determinations (e.g., right-side and left-side 118 and 120) may be unfeasible for the vehicle 114 to perform as valid trajectories. For instance, the driving paths 118 and 120 may be generated using a sampled grid from an occupancy map comprising spaced layers. Thus, the driving paths 118 and 120 generated by the planning component 102 may be suitable for performing quick and accurate side association determinations, after which the planning component 102 may determine a more detailed and feasible vehicle trajectory that complies with the side association. In several examples, the driving path generated may be used as an initialization seed for optimizations to determine the final drive trajectory (indicated by 134).

Figure 2:
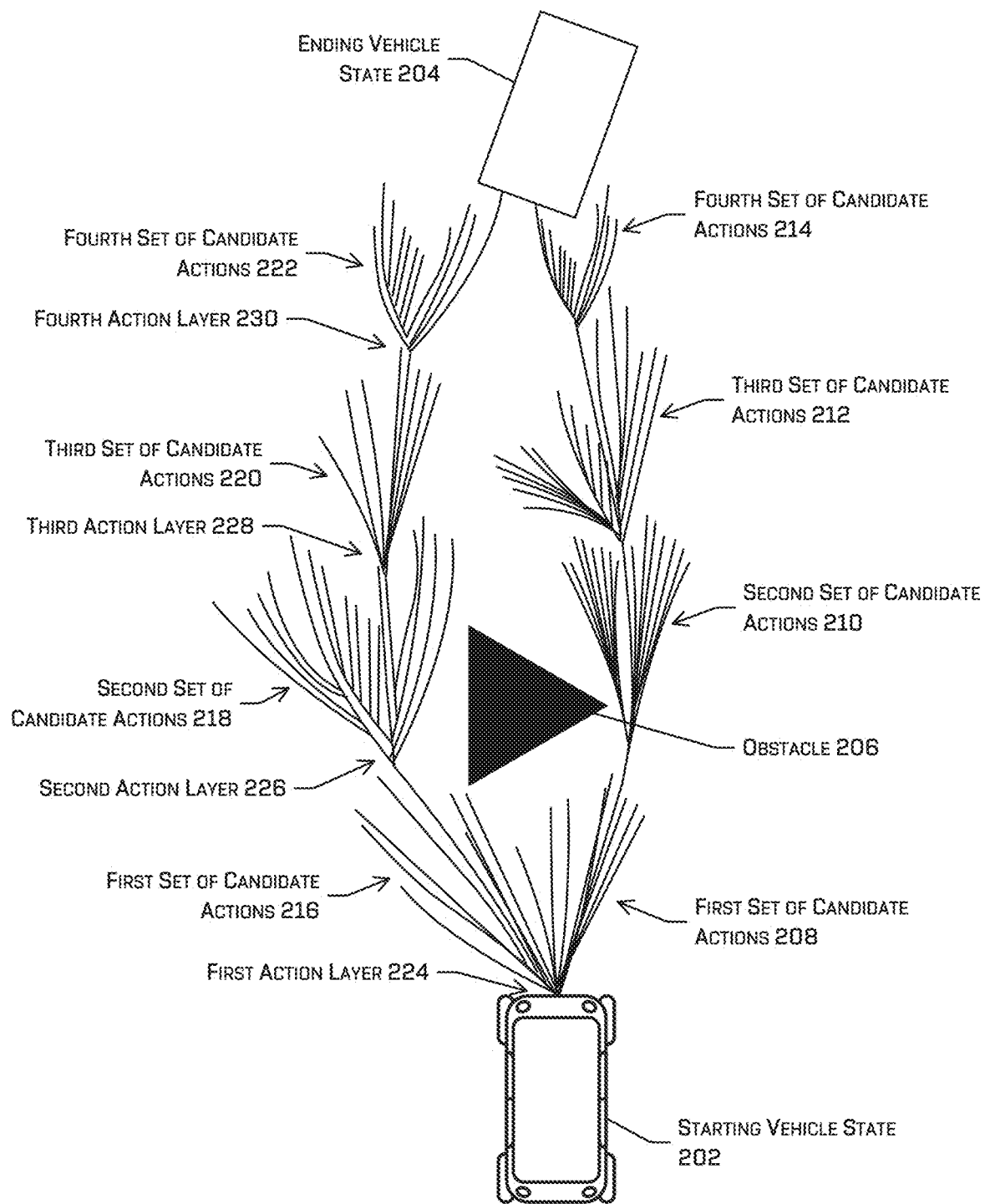
FIG. 2 illustrates a representation of multiple sets of candidate paths for branches of a tree search for a right-side association and left-side association of an object in an environment, in accordance with one or more examples of the disclosure.

FIG. 2 illustrates a representation of an environment 200 including multiple sets of candidate paths within branches of a tree search for a right-side association and left-side association of an object in the environment. As shown in this example, an autonomous vehicle 202 is depicted at a starting vehicle state, and is traversing the environment 200 towards a desired ending vehicle state 204. As noted above, the environment 200 may be a structured or unstructured driving environment, and the vehicle 202 as shown in the starting vehicle state may be following an existing trajectory (and/or within an existing planning corridor) to the desired ending vehicle state 204. In this example, the vehicle 202 has detected an obstacle 206 (which may be any type of object described herein) that is impeding the existing trajectory and/or is within the existing planning corridor of the vehicle 202. Accordingly, the vehicle 202 in this example may use a tree search algorithm to determine two or more potential driving paths for the vehicle 202, including at least one driving path that circumvents the obstacle 206 on the left, and at least one driving path that circumvents the obstacle 206 on the right.

As shown in this example, a first tree search may be initiated to determine a driving path to the right of the obstacle 206, and a second tree search may be initiated to determine a separate driving path to the left of the obstacle 206. For both tree searches, four different sets of candidate actions are generated at four different action layers (e.g., first action layer 224, second action layer 226, third action layer 228, and fourth action layer 230). For instance, for the right-side tree search, a first set of candidate actions 208 may be generated based at least in part on the current position of the vehicle 202. Additionally, for the left side tree search, a first set of candidate actions 216 may be generated. The first set of candidate actions 208 and the first set of candidate actions 216 may be based at least in part on the current position of the vehicle 202. Candidate actions 208 and candidate actions 216 (e.g., each of which may be a candidate driving path) can be determined based at least in part on an orientation, velocity, acceleration, steering rate, environment state data indicated in association with a root node associated with the operation of the vehicle 202. The space occupied by the vehicle 202 is represented at 406 as a dashed line. FIG. 4 also represents two roadway edges, roadway edge 408 and roadway edge 410. The height of a candidate action indicates a velocity and/or acceleration associated with the candidate action. In this example, the height of a candidate action.

The second set of candidate actions 210 and the second set of candidate actions 218 may be generated respectively for the right-side tree search and the left-side tree search, based at least in part on selecting a first candidate action from the associated first sets of candidate actions. Each of the second sets of candidate actions may be determined for exploration and based at least in part on a final vehicle state (e.g., final position, orientation, velocity, steering rate, etc.) that the first candidate action would cause the vehicle 202 to accomplish upon completing the execution of the first candidate action and environment state data. Each of the second sets of candidate actions 210 and candidate actions 218 may additionally or alternatively be determined based at least in part on environment state data indicated by prediction node and/or determined based at least in part on the associated first candidate action.

The third set of candidate actions 212 and the second set of candidate actions 220 may be generated respectively for the right-side tree search and the left-side tree search, based at least in part on selecting candidate actions from the associated second sets of candidate actions. Each of the third sets of candidate actions 212 and candidate actions 220 may similarly be based on selection of a second candidate action from among the associated second sets of candidate actions, environment state data generated in association therewith, and/or the final state that the second candidate action would effect.

Similarly, each of the fourth set of candidate actions 214 and the fourth set of candidate actions 222 may be generated respectively for the right-side tree search and the left-side tree search, based at least in part on selecting candidate actions from the associated third sets of candidate actions. Each of the fourth sets of candidate actions 214 and candidate actions 222 may similarly be based on selection of a third candidate action from among the associated third sets of candidate actions, environment state data generated in association therewith, and/or the final state that the third candidate action would effect.

In some examples, the representation of the tree searches within the environment 200 may be a visual depiction of a determinized sparse partially observable tree (DESPOT) determined according to a partially observable Markov decision process (POMDP).

As described above, each of the candidate actions within the sets of candidate actions 208-222 may have an associated cost. The costs associated with candidate actions may be determined by the planning component 102 according to any of the techniques discussed herein. In some cases, determining an associated cost may be part of determining a candidate action and/or cost determination may happen contemporaneously using different processing units or upon receiving the candidate action. In some examples, the cost associated with a candidate action may be determined based on one or more of the vehicle state data of the vehicle 202, environment state data associated with the environment 200, and/or the desired ending vehicle state 204.

In particular, a cost associated with a candidate action in a tree search may be based on various combinations of sub-costs, including but not limited to proximity cost(s), safety cost(s), comfort cost(s), and/or progress cost(s). These sub-costs may be based at least in part on the vehicle state data and environment state data indicated by the last predicted state node in a tree search (whether the last predicted state node is the root node or another prediction node). The proximity cost(s) can be based on a distance (e.g., a minimum, average, or other distance) that the candidate action take the vehicle 202 from any static and/or dynamic object. The safety cost(s) may include a score indicating conformance to rules of the road, proximity to other object(s) and/or a velocity associated with the candidate action. For instance, the safety cost may penalize candidate actions that are close to (e.g., within a threshold distance of) an object and/or are associated with a high speed, and may not penalize or only provide a small penalty to candidate actions that are close to an object but associated with a low speed (high-speed candidate actions that are far from other objects may be unpenalized by this cost, and/or proximity to a non-drivable surface (e.g., sidewalk, building, closed lane).

In an example where the safety cost(s) include a variable cost based on velocity and lateral distance to an object, the cost may be determined based at least in part on a hinge function, such as an L1 or L2 hinge function. In some examples, the hinge point in the hinge function where a penalty starts being applied may be based on the distance to the object, the velocity associated with the candidate action, the object track, and/or the object type. For example, a penalty may start applying further away from a biker than from a vehicle and/or a penalty may be higher/more severe for bikers than for vehicles. Moreover, the penalty may be more severe the faster the velocity associated with the candidate action once the candidate action is within the threshold distance of the vehicle (e.g., the hinge point of the hinge function). In at least one example, the threshold distance for applying the penalty specified by the L1 or L2 hinge function may be based at least in part on the velocity associated with the candidate action. In other words, fast candidate actions will have a penalty applied further from the object than slow candidate actions and the L1 or L2 penalty may become more severe (e.g., steeper slope in the case of L1, larger coefficient and/or squared value) the closer a fast candidate action comes to the object compared to the same distance from a slow candidate action to the object.

To determine a right-side driving path and left-side driving path from the vehicle 202 at the starting vehicle state to the ending vehicle state 204, using the tree search technique shown in this example and/or other cost-based path searching techniques, the planning component 102 may determine contiguous sets of connections between nodes of the different sets of nodes from the root node (e.g., the vehicle 202 at the starting vehicle state) to the ending vehicle state 204 in the deepest layer of the tree structure. To determine the left-side and right-side driving paths, the planning component 102 may comprise searching for solutions in the multivariate space that maximize a combination of displacement along the route and lateral/azimuthal diversity among the solutions (or meet a diversity heuristic) and minimize cost based at least in part on the cost map in the time interval given. In some examples, before conducting a full search for a driving path, the planning component 102 may comprise determining if a previous left-side or left-side driving path determined by the planning component 102 is feasible (e.g., satisfies current constraints such as velocity, maximum steering angle, and/or boundaries; is impact-free; has a cost that is less than a cost threshold, etc.).

Various additional tree search techniques may be used to determine a side association for an object as described herein, including but not limited to alternately determining a candidate action and predicting a future state based on that candidate action, determining costs associated with candidate actions (including estimations of transition costs from a current or former state to a next state of the vehicle 202), determining cost estimates based on alternately applying lower a bound cost and an upper bound cost, and/or predicting the future states of the vehicle 202 based on a machine learning model classification of dynamic objects as being reactive objects or passive objects. Additional examples and further description of determining driving paths (and/or trajectories) using tree search techniques can be found, for example, in U.S. patent application Ser. No. 17/394,334, filed on Aug. 4, 2021, and titled, "Vehicle Trajectory Control Using A Tree Search," which is incorporated by reference herein in its entirety for all purposes.

Figure 3:
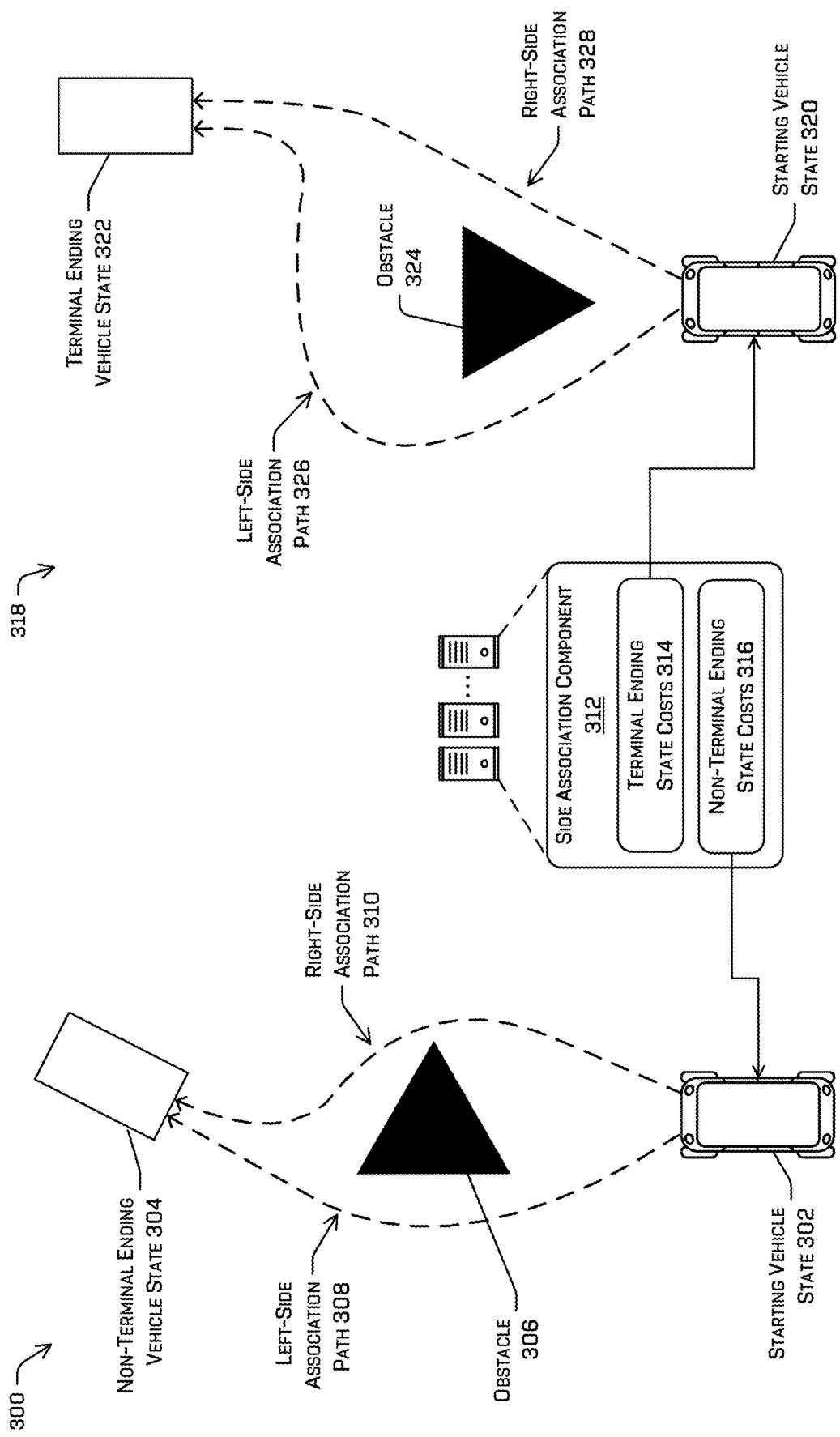
FIG. 3 illustrates two examples of determining right-side associations and/or left-side associations for an object in an environment, based on costs associated with left-side and right-side driving paths, in accordance with one or more examples of the disclosure.

FIG. 3 illustrates two examples of determining right-side associations and/or left-side associations for an object in an environment, based on costs associated with the left-side and right-side driving paths. As shown in this example, determining side associations for objects may be performed by a side association component (e.g., within a planning component 102), based on comparing costs between one or more right-side driving paths and left-side driving paths relative to the object.

In this example, a vehicle 302 at a starting vehicle state in the environment 300 to a non-terminal ending vehicle state 304. As noted above, an ending vehicle state May be referred to as terminal when the vehicle plans to stop at the ending vehicle state. For instance, ending vehicle states that correspond to parking spots, pulling-over locations t perform passenger pick-ups or drop-offs, and/or stopping locations to allow the vehicle to shift to reverse, may be referred to as terminal. In contrast, ending vehicle states where the vehicle does not intend to stop, but rather drives through the state as an intermediate or continuing point to another destination, may be referred to as non-terminal states.

As shown in environment 300, the vehicle 302 has detected an obstacle 306 that may be positioned on the current trajectory of the vehicle 302, in the current planning corridor of the vehicle 302, and/or in the general proximity of the vehicle 302. The planning component 102 of the vehicle 302 has determined a left-side association path 308 and a right-side association path 310, each path leading from the vehicle 302 around the obstacle 306 and to the ending vehicle state 304. In some examples, the left-side association path 308 and right-side association path 310 may be driving paths generated using cost-based tree search techniques such as those described above in FIG. 2. For instance, any number of left-side and/or right-side association paths may be generated by the planning component 102, and the left-side association path 308 and right-side association path 310 may represent the lowest cost and/or most optimal driving paths based on the tree search techniques performed.

Driving environment 318 depicts a similar driving scenario to that shown in environment 300, in which a vehicle 320 at a starting vehicle state may traverse the environment 318 to a vehicle ending state 322. As shown in this example, the vehicle ending state 322 is a terminal state (e.g., a parking space, pull-over location, etc.). As in the previous example, the vehicle 320 has detected an obstacle 324 that may be blocking (or otherwise impacting) the planned driving path of the vehicle 320 to the vehicle ending state 322. In response to detecting the obstacle 324, the planning component 102 of the vehicle 320 has determined a left-side association path 326 and a right-side association path 328 leading from the vehicle 320, around the obstacle 324, and to the vehicle ending state 322.

In various examples, the left-side association paths 308 and 326, and the right-side association paths 310 and 328 may be driving paths generated using cost-based tree search techniques, such as those described above in FIG. 2. For instance, any number of left-side and/or right-side association paths may be generated during a tree search (or other search technique) for a lowest cost driving path, and the left-side and right-side association paths depicted in FIG. 3 may represent the lowest cost (e.g., safest, most efficient, etc.) driving paths from each vehicle, around its designated side of the obstacle, and to its corresponding ending vehicle state.

As shown in this example, a side association component 312 within the vehicle 302 and/or within the vehicle 320 may determine and compare costs between the corresponding left-side and right-side association paths, to determine the proper side association for the object. In some cases, the side association component 312 may determine and compare the path costs of the corresponding left-side and right-side association paths, and may determine the side association of the object based on the minimum path costs. For instance, in environment 300, the side association component 312 may determine that the left-side association path 308 is a lower cost path than the right-side association path 310. As a result, the side association component 312 may associate the obstacle 306 with right-side surface (or wall) of the current planning corridor of the vehicle 302. In contrast, in environment 318, the side association component 312 may determine that the right-side association path 328 is a lower cost path than the left-side association path 326. As a result, the side association component 312 may associate the obstacle 324 with left-side surface (or wall) of the current planning corridor of the vehicle 320.

In some instances, a side association component 312 may determine and apply different cost metrics to evaluating the right-side and left-side driving paths, in different driving scenarios and/or based on different attributes of the vehicle, the object, the ending state, and/or the driving environment. For instance, in this example, the side association component 312 may include separate sets of terminal ending state costs 314 and non-terminal ending state costs 316. In some examples, the terminal ending state costs 314 may include a heuristics cost in which a cost plot is used to determine a cost value for moving the vehicle from a current reference pose (e.g., position and orientation) to a desired target reference pose (e.g., the position and orientation of the ending vehicle state). In such an examples, computational resources may be minimized by relying on a table or map of previously computed values (e.g., as may be references by looking up the current state, end state, and/or distance therebetween). In contrast, the non-terminal ending state costs 316 may include no heuristics costs, but may include one or more additional costs, including but not limited to kinematic costs, path length costs, travel time costs, acceleration costs, proximity costs, and/or path confidence cost. Any number of combinations of the costs described herein, including weight values associated with certain costs and/or including composite costs based on multiple underlying costs, may be used by the side association component 312 to evaluate and compare the costs of right-side and left-side paths.

Because different costs may be used for different environments or driving scenarios, the side association component 312 may potentially determine different side associations for objects in two different instances even with the object and vehicle starting and ending states are identical. In this example, the side association component 312 may use different costs for determining a side association depending on whether the vehicle end state is terminal or non-terminal. However, in other examples, the side association component 312 may use different costs for determining a side association based on, for instance, the vehicle type or other vehicle attributes, the current location/geographic region of the vehicle, the current driving conditions (e.g., weather, traffic, road conditions, etc.), and/or the preferences of the vehicle operator or passengers.

Figure 4A:
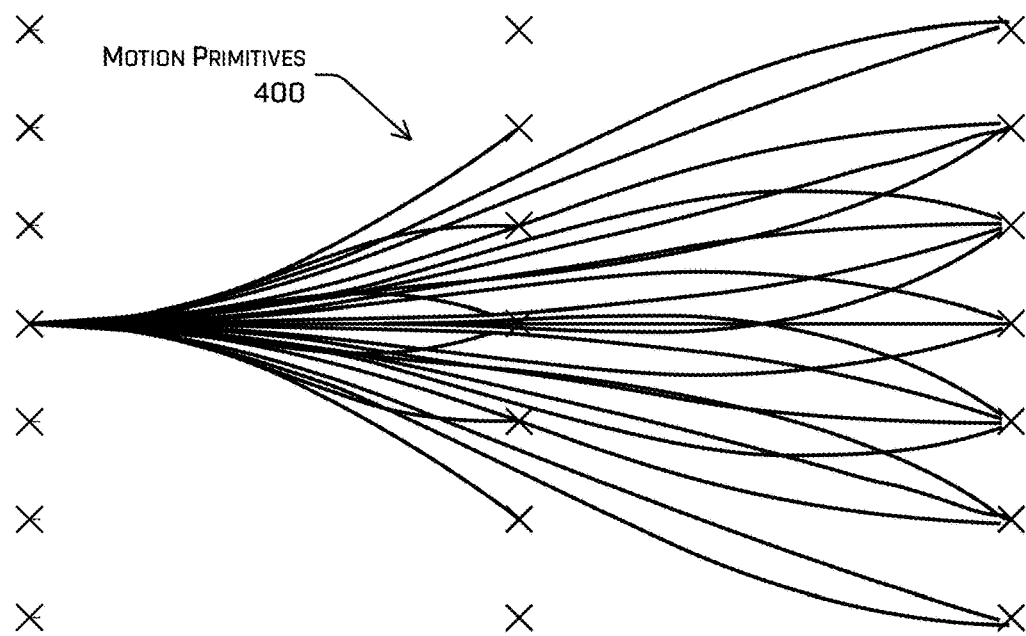
FIG. 4A illustrates an example set of motion primitives, in accordance with one or more examples of the disclosure.
Figure 4B:
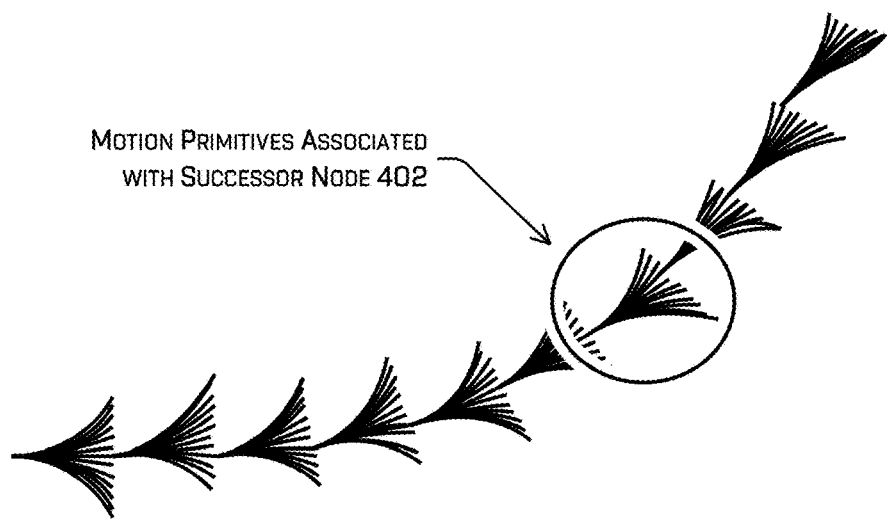
FIG. 4B illustrates an example of a directed graph and/or indication of successor nodes and respective motion primitives of predecessors selected by a search, in accordance with one or more examples of the disclosure.

FIG. 4A illustrates an example set of motion primitives, and FIG. 4B illustrates an example directed graph and/or indication of successor nodes and respective motion primitives of predecessors selected by a search. As described above, various techniques described herein may include determining and using sets of motion primitives and/or cost plots to determine costs associated with driving paths in the environment. For instance, in some cases a cost plot may be determined based on a set of motion primitives. As shown in this example, FIG. 4A depicts a set of motion primitives 400. Although a limited number of motion primitives are shown in this example for clarity, in other examples a set motion primitives may comprise hundreds or thousands of motion primitives. In some instances the set of motion primitives 400 may be precomputed (e.g., conducting the operations discussed herein before run-time) by a remote computing device and/or the autonomous vehicle (e.g., when the autonomous vehicle is idling/not currently accomplishing a mission, when the autonomous vehicle is being evaluated and/or maintained, etc.).

In various examples, motion primitives 400 may be a representation of a feasible motion of an autonomous vehicle, such as a polynomial line, a cubic spiral, Bezier, clothoid, and/or the like. In some examples, motion primitive may be represented as a cubic polynomial. Additionally or alternatively, the determining the set of motion primitives 400 may include determining motion primitives having parameters that connect a first pose and a second pose in an inertial frame of reference. For example, determining the set of motion primitives may include determining motion primitives that connect an initial pose (e.g., a reference pose) to a target pose, and iterate through all possible target poses in a bounded space based at least in part on a predetermined resolution and one or more smoothness constraints (e.g., minimum and/or maximum value(s) of the parameters) to ensure that the motion primitives do not cause erratic or uncomfortable steering controls. In some examples, the smoothness constraints may be based at least in part on a velocity range associated with the vehicle. In some examples, multiple sets of motion primitives may be generated for different velocity ranges (e.g., a first set of motion primitives may be generated for a first velocity range, e.g., 80-100 kilometers per hour based at least in part on a first set of smoothness constraints). For example, the smoothness constraints may constrain the parameters more (e.g., reduce in value) as velocity increases, resulting in smoother/straighter motion primitives for higher speeds. The set of motion primitives 400 in this example depicts a set of such motion primitives having a resolution of x=5, y=1, and θ=π/8. In an additional or alternate example for generating hundreds or thousands of motion primitives, the resolution may be x=0.2, y=0.2, and θ=0.2. Further, in some examples, determining the set of motion primitives may comprise solving, e.g., via Newton's method for finding function roots, for parameters associated with a spiral/polynomial/Bezier/etc. that originates at the origin and terminates at a location that is a multiple of the resolution (e.g., multiple(s) of x=0.2, y=0.2, and 0=0.2 up to a bound). Other root-finding methods may be used to solve for the parameters, such as, for example, Halley's method, the Secant method, Steffensen's method, Brent's method, and/or the like. Additional examples and further description of various techniques for determining sets of motion primitives 400 can be found, for example, in U.S. Patent Application Pub. 2021/0347382, filed on May 11, 2020, and titled, "Unstructured Vehicle Path Planner," which is incorporated by reference herein in its entirety for all purposes.

FIG. 4B depicts an example of a predecessor node and motion primitives associated with succors to the predecessor node of an r-th node in a path 402. In this example, FIG. 4B includes such a depiction for each node/connection selected based at least in part on a search. In various examples, determining whether a motion primitive connects the first node to the second node may comprise transforming the set of motion primitives into an inertial frame and/or route frame associated with the first node and determining that the motion primitive starts at the first node and terminates at the second node. Based at least in part on determining that the motion primitive starts at the first node and terminates at the second node, the search may comprise identifying the first node as a predecessor to the second node and the second node as a successor to the first node. In some examples, the search may comprise determining a subset of motion primitives that start at the first node and terminate at the second node. Additionally or alternatively, the search may be based at least in part on a directed graph that comprises such subsets for each sampled node (e.g., an identification of the nodes that are successors to each sampled node and/or a motion primitive that connects the successors to a sampled node). In some examples, such a directed graph (e.g., FIG. 4A) may be determined before conducting the search.

Figure 5A:
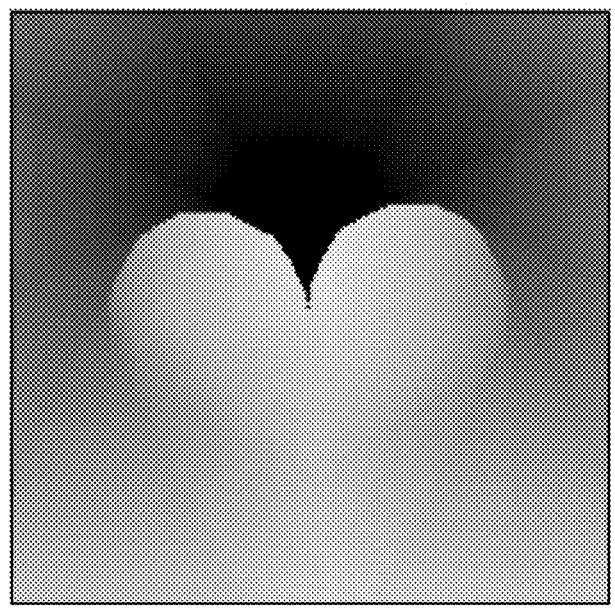
FIGS. 5A and 5B illustrate portions of an example heuristic cost plot, including values indicated by x and y locations of a heuristic cost plot (in FIG. 5A), and corresponding yaw values (in FIG. 5B), in accordance with one or more examples of the disclosure.
Figure 5B:
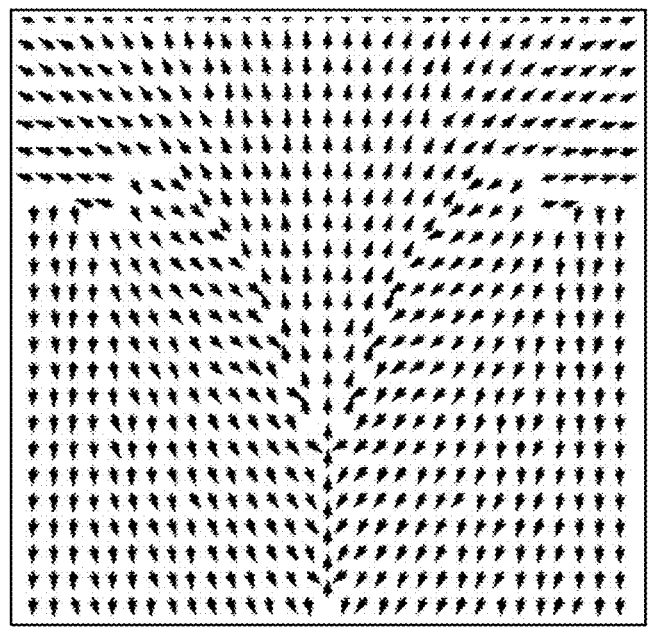

FIGS. 5A and 5B illustrate portions of an example heuristic cost plot, including values indicated by x and y locations of a heuristic cost plot (in FIG. 5A), and corresponding yaw values (in FIG. 5B), in accordance with one or more examples of the disclosure. In this example, FIGS. 5A and 5B depict respective portions of an example cost plot. Cost plot 500 depicts cost values (darker shades indicate lower cost, lighter shades indicate higher cost) associated with x and y positions at the yaw positions specified by cost plot 502, which may be the minimum cost yaw for each position in the depicted example. In various examples, such a cost plot may be associated with a heuristic cost. For instance, the heuristic costs in cost plot 500 may be computed (or precomputed) for all potential starting positions relative to a desired end position and/or orientation and such costs stored in a cost plot 500. In some examples, the cost plot 500 and cost plot 502 may be precomputed at a computing device external to the vehicle. When needed, the planning component 102 may access cost plot(s) from a local or remote memory, and rotate the cost plots to the appropriate frame of reference based on an initial (or reference) pose and the target pose of the vehicle.

As described herein, vehicles and other objects in the environment may have a "pose (which also be referred to herein as a "geometric pose") comprising a location and/or orientation of the overall object relative to a frame of reference. In some examples, pose may be indicative of a position of an object (e.g., the vehicle), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object.

Although the heuristic costs represented in the cost plot 500 and cost plot 502 may be precomputed in some examples, additionally and/or alternatively, the data in cost plot(s) may be altered based at least in part on a transformation from the position and/or orientation of the selected state (or note) as compared with the final (or starting) state. Thus, the heuristic costs indicated in cost plot 500 may indicate a cheapest cost to move from one vehicle pose (e.g., a reference pose) to another vehicle pose (e.g., a target pose). In some examples, when an initial vehicle position or pose lies outside the cost plot used to determine heuristic costs (e.g., cost plot 500), the planning component may estimate the heuristic costs based on interpolations (or extrapolations) of the closest point or point in the cost plot.

Figure 6A:
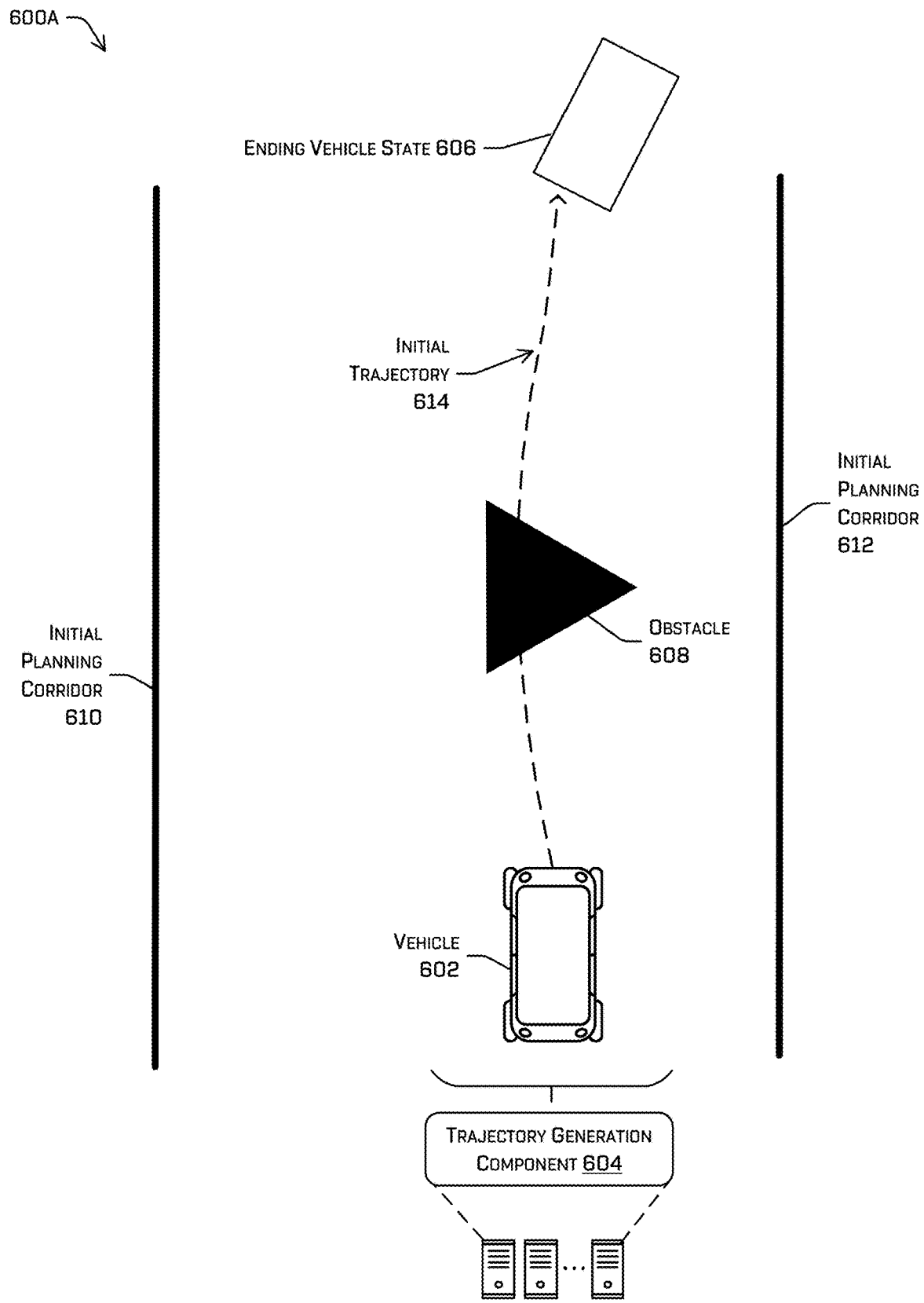
FIGS. 6A-6C illustrate examples of determining a side association for an object in a driving environment, and determining an updating planning corridor and trajectory for a vehicle based on the side association, in accordance with one or more examples of the disclosure.
Figure 6B:
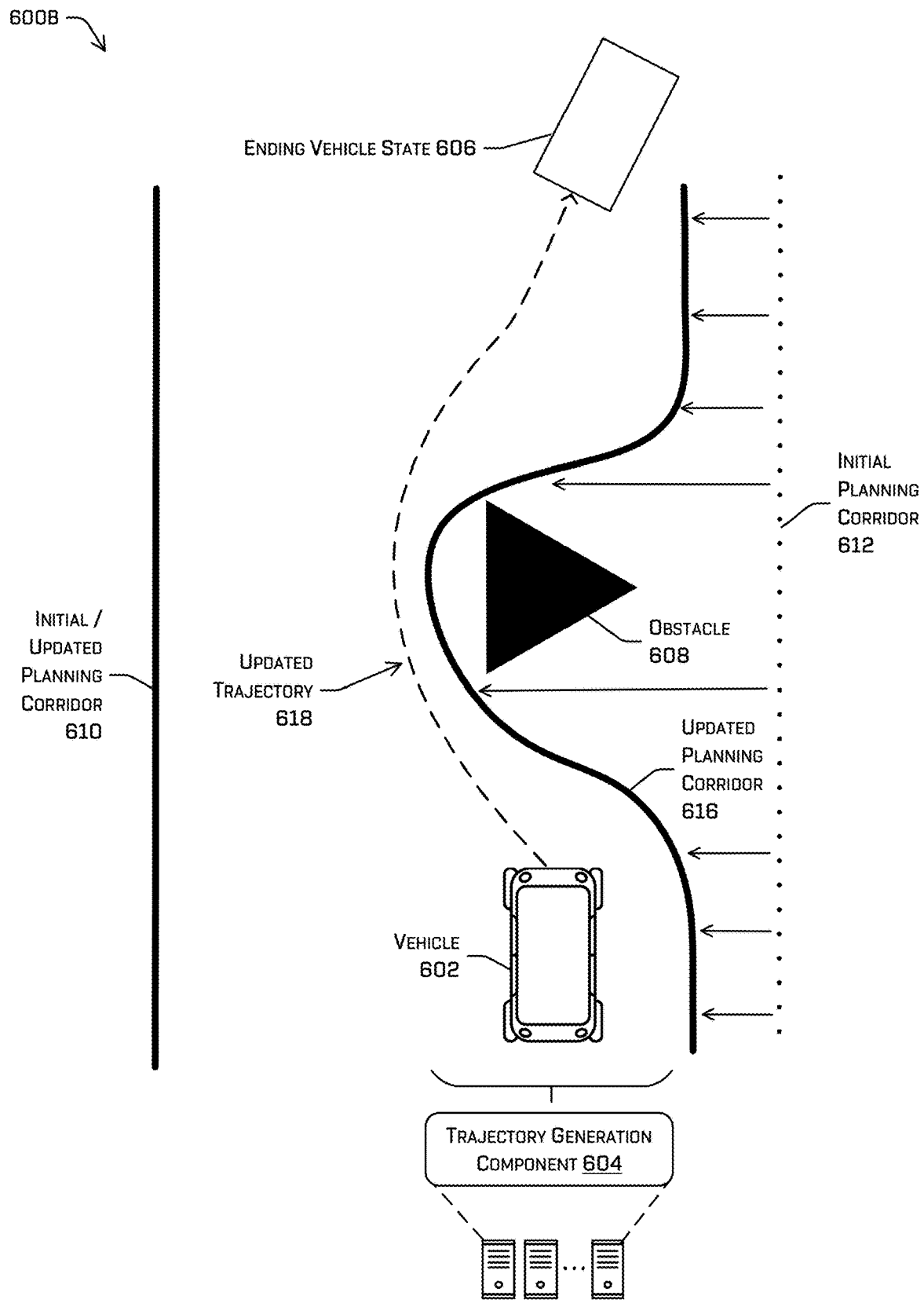
Figure 6C:
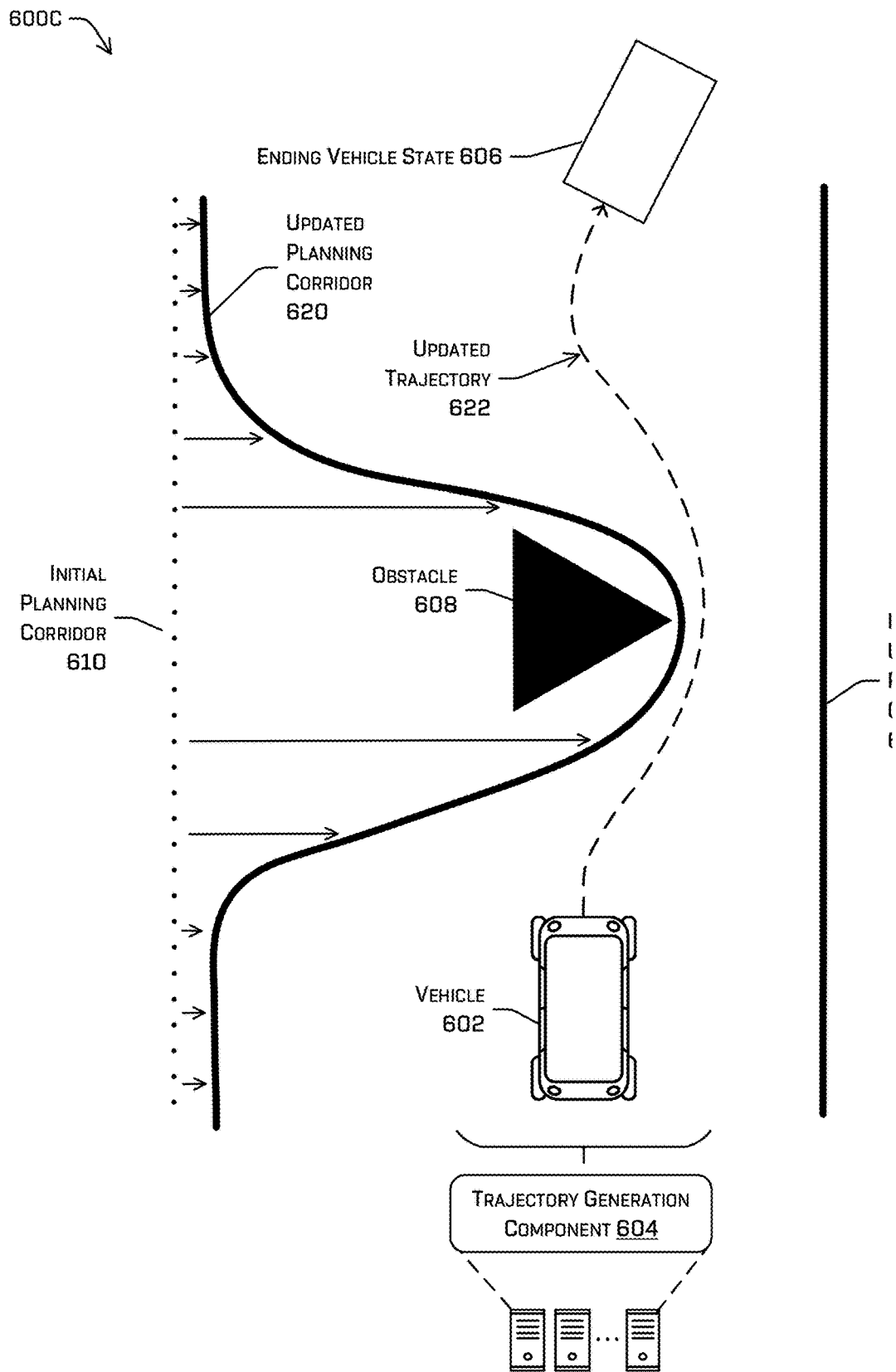

FIGS. 6A-6C illustrate two examples of determining a left-side association and a right-side for an object in a driving environment, and determining an updating planning corridor and trajectory for a vehicle based on the side associations. In these examples, FIG. 6A depicts an initial driving environment 600A, in which a vehicle 602 including a trajectory generation component 604 traverses the environment toward a desired ending vehicle state 606. As shown in this example, the vehicle 602 an obstacle 608 (or blocking region) that may block the progress of the vehicle 602 toward its desired ending vehicle state. At the time when the obstacle 608 is detected, the vehicle 602 is traversing the environment in which an initial planning corridor has been defined for the vehicle 602, based on boundary lines 610 and 612. Using the initial planning corridor, the trajectory generation component 604 has determined an initial trajectory 614 for the vehicle 202 to its desired ending vehicle state 606.

As shown in this example, the vehicle may determine that the obstacle 608 is a blocking object (or blocking region) for the vehicle 202. For instance, the vehicle 602 may initially detect the obstacle 608 using sensor data as it traverses the environment 600A, and may determine that the obstacle 608 may cause a potential collision based on the initial trajectory 614 (and/or the initial planning corridor) of the vehicle 602 to the ending vehicle state 606. As a result of the detection, the vehicle 602 may perform various side association techniques described herein (e.g., coarse searching and/or cost-optimization techniques) to determine a side association for the obstacle 608. For instance, as described above in reference to FIGS. 1-5B, a side association component 312 within the vehicle 602 may be configured to determine a side association for the obstacle 608 by performing a tree search technique to determine a lowest cost driving path to the ending vehicle state 606. The side association component 312 may then determine whether the lowest cost driving path passes on the right side or the left side of the obstacle 608.

FIG. 6B depicts an updated driving environment 600B, in which the vehicle 202 has determined a right-side association for the obstacle 608. Based on the determination of a right-side association in this example, the vehicle 602 may update the planning corridor to exclude the obstacle 608 and the area to the right of the obstacle, thereby causing the vehicle 202 to determine an updated trajectory to the left of the obstacle 608. As shown in this example, the initial planning corridor defined by the boundary lines 610 and 612, has been changed to an updated planning corridor defined by the boundary lines 610 and 616. As shown in FIG. 6B, the updated planning corridor (defined by the boundary lines 610 and 616) may exclude from the initial planning corridor both the blocking region corresponding to the obstacle 608 and an area between the obstacle 608 and the right-side boundary line 612 of the initial planning corridor. Based on the updated planning corridor, the vehicle 602 may use the trajectory generation component 604 to generate and/or optimize an updated trajectory 618 for the vehicle 602, that passes the obstacle 608 on the left side and continues to the vehicle ending state 606. Additional examples and further description of various techniques for determining vehicles trajectories based at least in part on drivable areas, such as corridors or drive envelops, can be found, for example, in U.S. Pat. No. 11,110,992, filed May 11, 2018, and titled, "Vehicle Trajectory Modification For Following," and in U.S. Pat. No. 10,614,717, filed May 17, 2018, and titled, "Drive Envelope Determination," both of which are incorporated by reference herein in its entirety for all purposes.

FIG. 6C depicts an alternative updated driving environment 600C, in which the vehicle 202 has determined a left-side association for the obstacle 608. Based on the determination of a left-side association in this example, the vehicle 602 may update the planning corridor to exclude the obstacle 608 and the area to the left of the obstacle, thereby causing the vehicle 202 to determine an updated trajectory to the left of the obstacle 608. As shown in this example, the initial planning corridor defined by the boundary lines 610 and 612, has been changed to an updated planning corridor defined by the boundary lines 612 and 620. As shown in FIG. 6C, the updated planning corridor (defined by the boundary lines 612 and 620) may exclude from the initial planning corridor both the blocking region corresponding to the obstacle 608 and an area between the obstacle 608 and the left-side boundary line 610 of the initial planning corridor. Based on the updated planning corridor, the vehicle 602 may use the trajectory generation component 604 to generate and/or optimize an updated trajectory 622 for the vehicle 602, that passes the obstacle 608 on the right side and continues to the vehicle ending state 606.

Figure 7:
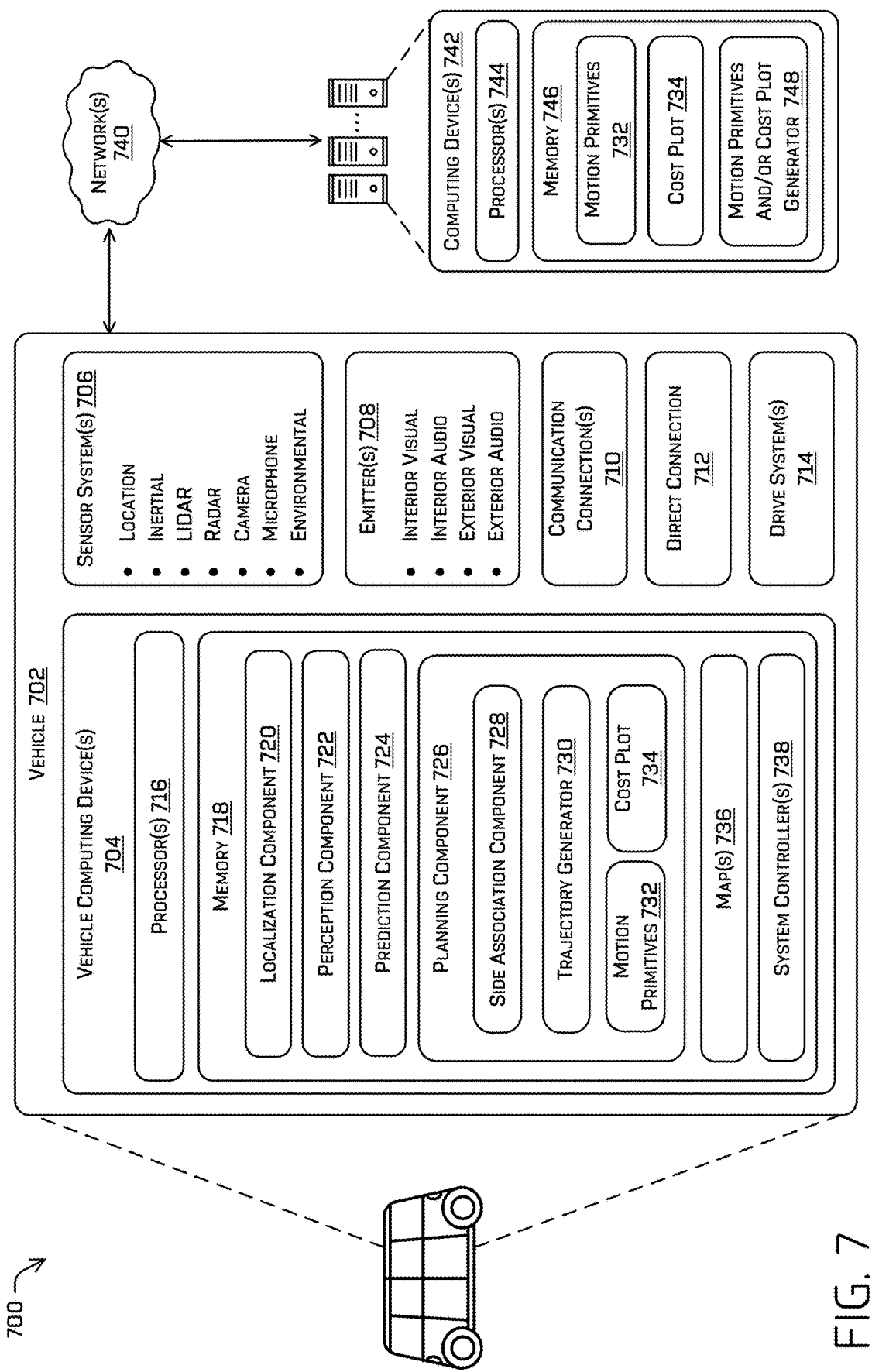
FIG. 7 depicts a block diagram of an example system for implementing various techniques described herein.

FIG. 7 depicts a block diagram of an example system 700 for implementing various techniques described herein. The system 700 can include a vehicle 702, which can correspond to an autonomous or semi-autonomous vehicle configured to perform various techniques described herein for determining cost-based side associations for objects detected by the vehicle in an environment, and using the side associations to determine off-route trajectories to navigate the vehicle around the object and toward the intended destination. For instance, vehicle 702 may include components configured to detect objects in an environment, along with a planning component and various subcomponents to determine side associations of objects, update planning corridors based on the side associations, and determine off-route trajectories for the vehicle, as described in the above examples. The vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may or may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722, a prediction component 724, a planning component 726, one or more maps 736, and one or more system controllers 738. Additionally, in this example, the planning component 726 may include any number of additional components configured to perform various techniques described herein, including a side association component 728, a trajectory generator component 730, motion primitives 732, and/or a cost plot 734. Though depicted in FIG. 7 as residing in the memory 718 for illustrative purposes, one or more of the localization component 720, a perception component 722, a prediction component 724, a planning component 726, one or more maps 736, and one or more system controllers 738 can additionally, or alternatively, be accessible to the vehicle 702 (e.g., stored on, or otherwise accessible by, memory remote from the vehicle 702).

The vehicle computing device(s) 704 may generally perform processing to control how the vehicle maneuvers within an environment. The vehicle computing device(s) 704 may implement various artificial intelligence (AI) techniques, such as machine learning, to analyze and understand the environment around the vehicle 702 and/or instruct the vehicle 702 to move within the environment. The various components of the vehicle computing device(s) 704, such as the localization component 720, perception component 722, prediction component 724, and/or planning component 726 may implement various AI techniques to localize the vehicle, detect objects around the vehicle, segment sensor data, determine classifications of the objects, predict object tracks, generate trajectories for the vehicle 702 and the objects around the vehicle, and so on. In some examples, the vehicle computing device(s) 704 may process data from multiple types of sensors on the vehicle, such as light detection and ranging (lidar) sensors, radar sensors, image sensors, depth sensors (time of flight, structured light, etc.), cameras, and the like, within the sensor systems 706.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 may provide data to various components of the vehicle 702 to determine an initial position, pose, and/or trajectory of the vehicle 702, as discussed herein.

In some instances, and in general, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the prediction component 724 can include functionality to generate predicted information associated with objects in an environment. As an example, the prediction component 724 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 724 can generate one or more predicted positions, predicted velocities, predicted trajectories, etc., for such target objects based on attributes of the target object and/or other objects proximate the target object.

In general, the planning component 726 can determine a path for the vehicle 702 to follow to traverse the environment. The planning component 726 can include functionality to determine various routes and trajectories and various levels of detail. For example, the planning component 726 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 726 can generate an instruction for guiding the autonomous vehicle along at least a portion of the route from the first location to the second location. In at least one example, the planning component 726 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate. In some instances, the planning component 726 can generate one or more trajectories for the vehicle 702 based at least in part on predicted location(s) associated with object(s) in an environment. In some examples, the planning component 726 can use temporal logic, such as linear temporal logic and/or signal temporal logic, to evaluate one or more trajectories of the vehicle 702.

The memory 718 can further include one or more maps 736 that can be used by the vehicle 702 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 736 can include at least one map (e.g., images and/or a mesh).

In some examples, the vehicle 702 can be controlled based at least in part on the maps 736. That is, the maps 736 can be used in connection with the localization component 720, the perception component 722, the prediction component 724, and/or the planning component 726 to determine a location of the vehicle 702, identify objects in an environment, and/or generate routes and/or trajectories to navigate within an environment.

In some examples, the one or more maps 736 can be stored on a remote computing device(s), such as within the memory 746 of the computing device(s) 742, and may be accessible to the vehicle 702 via network(s) 740. In some examples, multiple maps 736 can be retrieved from the memory 746, and stored based on, for example, a characteristic (e.g., type of entity, time of day, day of week, season of the year, etc.). Storing multiple maps 736 can have similar memory requirements, but can increase the speed at which data in a map can be accessed.

In at least one example, the vehicle computing device(s) 704 can include one or more system controllers 738, which can be configured to control steering, propulsion, braking, safety, emitters, communication, and other systems of the vehicle 702. These system controller(s) 738 can communicate with and/or control corresponding systems of the drive system(s) 714 and/or other components of the vehicle 702. For example, the planning component 726 may generate instructions based at least in part on perception data generated by the perception component 722 and transmit the instructions to the system controller(s) 738, which may control operation of the vehicle 702 based at least in part on the instructions. In some examples, if the planning component 726 receives a notification that a track of an object was "lost" (e.g., an object no longer appears in perception data and isn't occluded by any other objects), the planning component 726 may generate an instruction to bring the vehicle 702 to a safe stop and/or to transmit a request for teleoperator assistance.

As can be understood, the components discussed herein (e.g., the localization component 720, the perception component 722, the prediction component 724, the planning component 726, the one or more maps 736, and/or the one or more system controllers 738) are described as divided for illustrative purposes. However, the operations performed by the various components can be combined or performed in any other component. Further, any of the components discussed as being implemented in software can be implemented in hardware, and vice versa. Further, any functionality implemented in the vehicle 702 can be implemented in the computing device(s) 742, or another component (and vice versa).

In at least one example, the sensor system(s) 706 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the time of flight sensors can include individual time of flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 740, to the one or more computing device(s) 742 at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 740. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. The vehicle 702 can have a single drive system 714, or multiple drive systems 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the prediction component 724, planning component 726, the one or more maps 736, and the one or more system controllers 738 can process sensor data, as described above, and can send their respective outputs, over the one or more network(s) 740, to one or more computing device(s) 742. In at least one example, the respective outputs of the components can be transmitted to the one or more computing device(s) 742 at a particular frequency, after a lapse of a predetermined period of time, in near real-time, etc. Additionally or alternatively, the vehicle 702 can send sensor data to one or more computing device(s) 742 via the network(s) 740, including raw sensor data, processed sensor data and/or representations of sensor data. Such sensor data can be sent as one or more log files to the computing device(s) 742 at a particular frequency, after a lapse of a predetermined period of time, in near real-time, etc.

The computing device(s) 742 can include processor(s) 744 and a memory 746 storing one or more motion primitives 732, cost plot(s) 734, and/or the motion primitives and/or cost plot generator 748. In various examples, the computing devices 742 may implement one or more machine learning systems or heuristics-based systems to determine the motion primitives 732, cost plot(s) 734, and/or the motion primitives and/or cost plot generator 748. Additionally, any of the features or functionalities described in connection with the side association component 728 (e.g., various techniques for determining cost-base side associations of objects) and/or the trajectory generator 730 (e.g., determining and optimizing vehicle trajectories etc.) also may be performed by computing devices 742 using heuristics-based techniques and/or neural network models and algorithms. In this example, neural networks are algorithms that pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Any type of machine learning can be used consistent with this disclosure.

In some instances, the planning component 726 may include a side association component 728 and/or a trajectory generator component 730, as described in various examples herein. The side association component 728 may be similar or identical to the side association component 312 described above in FIG. 3, and the trajectory generator component 730 may be similar or identical to the trajectory generation component 604 described above in FIG. 6. Additionally or alternatively, the planning component 726 may store (one or more sets of motion primitives 732 and/or cost plot(s) 734 in association with the set of motion primitives, such as those motion primitives and/or cost plots described in various examples herein. In other examples, motion primitives 732 and/or cost plot(s) 734 may be stored elsewhere within the memory 718 of the vehicle 702. Additionally or alternatively, the memory 718 of the vehicle 702 and/or the memory 746 of the computing device(s) 742 may store motion primitives 732, cost plot(s) 734, and/or a motion primitives and/or cost plot generator 748 that may comprise a machine-learned (ML) model (e.g., a neural network) and/or a parallel processing component.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

Figure 8:
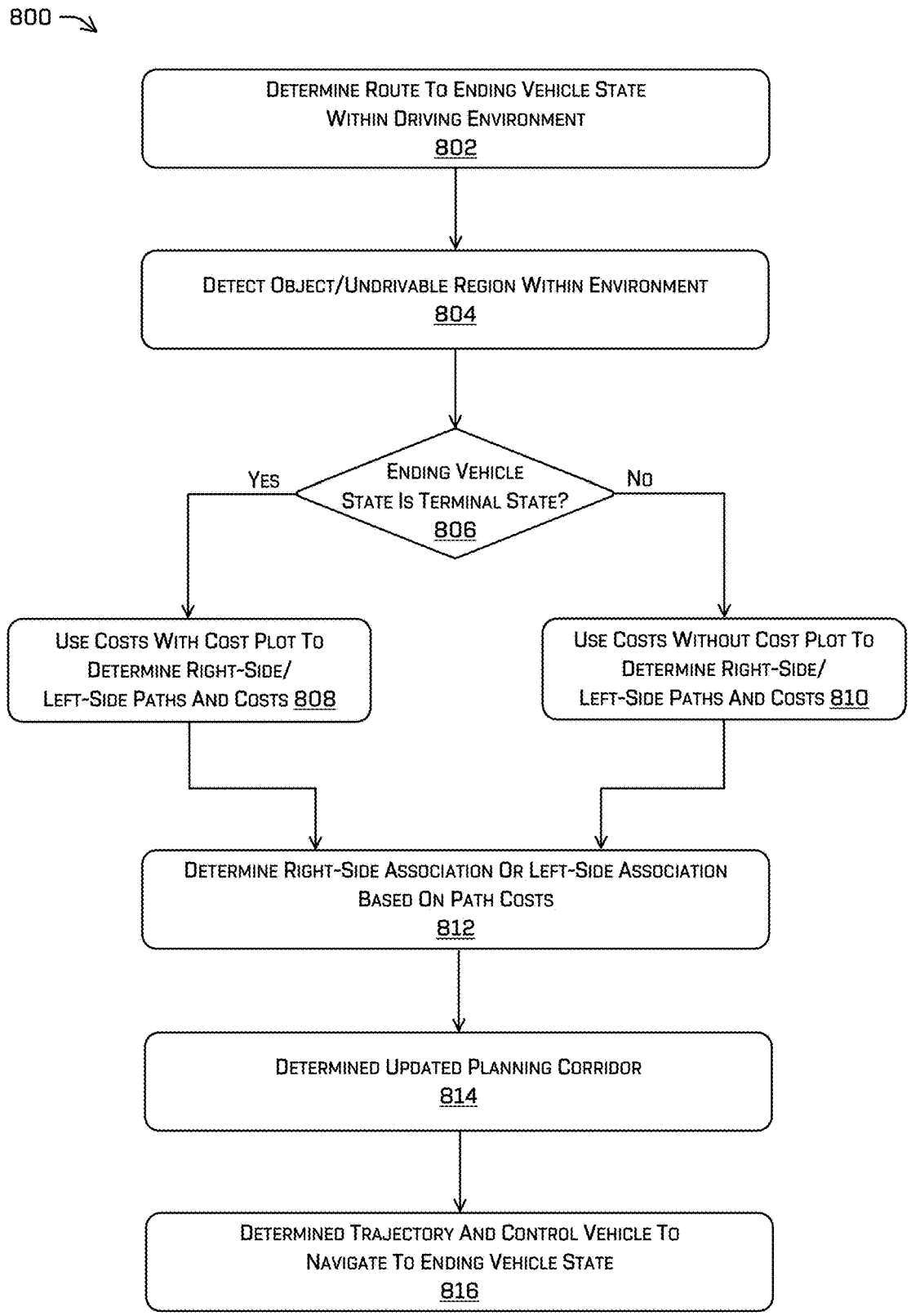
FIG. 8 is a flow diagram illustrating an example process of determining a cost-based side association for an object, and determining and executing a trajectory by autonomous vehicle based on the side association, in accordance with one or more examples of the disclosure.

FIG. 8 is a flow diagram illustrating an example process of determining a cost-based side association for an object, and determining and executing a trajectory by autonomous vehicle based on the side association, in accordance with one or more examples of the disclosure. As described below, process 800 may be performed by one or more computer-based components configured to implement the various functionalities described herein. For instance, some or all of the operations of process 800 may be performed by planning component 102 of an autonomous vehicle 114, which may include or be associated with a side association component 312 and/or a trajectory generation component 604.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, a planning component 102 associated with a vehicle 114 may determine a route for the vehicle to traverse a driving environment, from a starting vehicle state to an ending vehicle state. The starting and ending vehicle states may include positions and/or orientations of the vehicle, for instance a reference pose and a target pose. In some examples, at operation 802 the vehicle 114 may determine and follow an existing trajectory through the environment, and/or may determine an initial planning corridor from which trajectories may be determined. Additionally, as noted above, the environment in which the vehicle 114 operates may include an on-route and/or an off-route environment.

At operation 804, the vehicle 114 may detect an object within the environment. For example, a perception system of the vehicle 114 may use various sensors to capture and analyze sensor data (e.g., image or video data, radar data, lidar data, sonar data, etc.), and to detect and classify the object. The object detected in operation 804 may include a static object not capable of movement (e.g., a traffic sign, road debris, etc.), a dynamic object that is capable of movement but is not currently moving (e.g., a disabled vehicle, stationary pedestrian, etc.), a dynamic object that is moving (e.g., a pedestrian, bicycle, vehicle, animal, etc.), or an unclassified undrivable region that may or may not be moving. In some examples, the vehicle may determine that the object is blocking or otherwise impacting the current planning corridor and/or current trajectory of the vehicle 114.

At operation 806, the planning component 102 may determine whether the ending vehicle state of the vehicle 114 is a terminal or non-terminal state. A terminal ending vehicle state may refer to an ending state at which the vehicle intends to stop (e.g., a parking spot, pull-over location, stopping location to shift the vehicle into reverse, etc.). In contrast, ending vehicle states where the vehicle does not intend to stop, but rather drives through the state as an intermediate or continuing point to another destination, may be referred to as non-terminal states. As noted above, the planning component 102 (e.g., the side association component 312) may determine and apply different costs during side association determinations, based on whether or not the ending vehicle state is a terminal state. In some cases, the side association component 312 may calculate and use heuristic costs based on a cost plot for terminal ending vehicle states, but may use any other combination of costs (e.g., not including heuristic costs) for non-terminal ending vehicle states.

In this example, when the planning component 102 determines that the ending vehicle state is a terminal state (806: Yes), then at operation 808 the planning component 102 uses costs including heuristic costs (e.g., with a cost plot) to determine various driving paths that pass the object on the left and on the right, as well as the associated costs for the left-side and right-side driving paths. In contrast, when the planning component 102 determines that the ending vehicle state is a non-terminal state (806: No), then at operation 810 the planning component 102 uses a set of costs without including heuristic costs (e.g., without a cost plot) to determine various driving paths that pass the object on the left and on the right, as well as the associated costs for the left-side and right-side driving paths. In various examples, the side association component 312 may apply any number of costs and/or various combinations of costs when determining a side association for an object, including but not limited to proximity cost(s), safety cost(s), comfort cost(s), and/or progress cost(s). As described above, the side association component 312 may perform tree search techniques, during which it may determine candidate actions and associated costs, and then may determine an overall right-side driving path cost and left-side driving path cost.

At operation 812, the planning component 102 may determine a side association for the object, based on the driving paths and associated costs determined in operation 808 or in operation 810. For instance, the side association component 312 may determine either a left-side association or a right-side association for the object. As described above, the left-side or right-side association may define the homotopy class of possible trajectories for the vehicle, which may be limited only to trajectories that comply with the side association determination.

At operation 814, the planning component 102 may determine an updated planning corridor for the vehicle 114, based on the side association for the object. As described above, based on the side association for an object, the planning component may update the planning corridor to exclude the obstacle to the determined side of the planning corridor. Finally, at operation 816, the planning component 102 may determine an updated trajectory for the vehicle 114, and may control the vehicle to traverse the environment based on the updated trajectory. For example, a trajectory generation component may determine and/or optimize a feasible vehicle trajectory based on the updated planning corridor and/or homotopy class determined based on the side association of the object.

EXAMPLE CLAUSES

A. A system comprising: one or more processors; and one or more computer-readable media storing computer-executable instructions that, when executed, cause the one or more processors to perform operations comprising: receiving an initial planning corridor indicative of a region in an environment through which a vehicle is constrained to drive; receiving sensor data; determining, based at least in part on the sensor data, an object at least partially blocking a portion of the initial planning corridor; determining a first path between a starting vehicle state and an ending vehicle state passing on a first side of the object; determining a first cost associated with the first path; determining a second path between the starting vehicle state and the ending vehicle state passing on a second side of the object; determining a second cost associated with the second path; determining, based at least in part on the first cost and the second cost, a side association indicative of whether to pass on the first side or the second side of the object; determining, based at least in part on the sensor data, the side association, and the initial planning corridor, an updated planning corridor; determining, within the updated planning corridor, a trajectory for the vehicle; and controlling the vehicle within the environment based at least in part on the trajectory.

B. The system of paragraph A, wherein determining at least one of the first cost or the second cost is based at least in part on whether the ending vehicle state is associated with a terminal state or a non-terminal state.

C. The system of paragraph A, wherein the ending vehicle state is a terminal vehicle state, and wherein determining at least one of the first cost or the second cost comprises referencing a value associated with a cost plot based at least in part on a current vehicle state and the terminal vehicle state.

D. The system of paragraph A, wherein at least one of the first cost or the second cost comprises one or more of: a kinematic cost; a path length cost; a travel time cost; an acceleration cost; a proximity cost; or a path confidence cost.

E. The system of paragraph A, wherein determining the first path comprises: determining a grid comprising one or more layers disposed at intervals and defining a plurality of nodes associated with different locations in the environment; and determining, based at least in part on the grid, a first subset of nodes associated with the first path.

F. A method comprising: receiving sensor data associated with an environment; determining, based at least in part on the sensor data, a region in the environment; determining a first cost associated with a vehicle passing the region on a first side of the region; determining a second cost associated with the vehicle passing the region on a second side of the region; determining, based at least in part on the first cost and the second cost, and as a side association, an indication whether to traverse passed the region on the first side or the second side; determining, based at least in part on side association, a planning corridor; determining, based at least in part on the planning corridor, a trajectory for the vehicle; and controlling the vehicle in the environment based at least in part on the trajectory.

G. The method of paragraph F, wherein determining the trajectory is further based at least in part on a desired ending state of the vehicle, and wherein determining at least one of the first cost or the second cost is based at least in part on whether the desired ending state of the vehicle is a terminal state or a non-terminal state.

H. The method of paragraph F, further comprising: determining that a desired ending state of the vehicle is a terminal state, wherein determining at least one of the first cost or the second cost is based at least in part on a cost plot, wherein the cost plot includes a set of values associated with moving the vehicle from a range of positions and orientations to a target range and target orientation.

I. The method of paragraph F, wherein determining at least one of the first cost or the second cost is based at least in part on at least one of: a kinematic cost; a path length cost; a travel time cost; an acceleration cost; a proximity cost; or a path confidence cost.

J. The method of paragraph F, wherein determining the first cost comprises: determining, based at least in part on the sensor data, a data structure indicating occupied and unoccupied space in the environment; determining a route associated with the vehicle, the route including a starting state of the vehicle and a desired ending state of the vehicle; determining, based at least in part on the route, a first grid comprising one or more layers disposed at intervals along the route and defining a plurality of nodes associated with different locations in the environment; determining, based at least in part on the data structure, a first subset of nodes associated with a first candidate path; and determining, based at least in part on the first subset of nodes, the first cost.

K. The method of paragraph J, wherein determining the first subset of nodes comprises: determining a first set of candidate actions for controlling motion of the vehicle; determining a first candidate action of the first set of candidate actions, based at least in part on a first candidate action cost associated with the first candidate action; determining a predicted first vehicle state associated with the first candidate action; determining a second set of candidate actions for controlling motion of the vehicle from the predicted first vehicle state; determining a second candidate action of the second set of candidate actions, based at least in part on a second candidate action cost associated with the second candidate action; and determining a predicted second vehicle state associated with the second candidate action.

L. The method of paragraph F, wherein the planning corridor is an updated planning corridor, and wherein determining the updated planning corridor comprises: receiving an initial planning corridor associated with the vehicle; and determining, as the updated planning corridor, a portion of the planning corridor exclusive of the region and exclusive of an area of the initial planning corridor between the region and one side of the initial planning corridor.

M. The method of paragraph F, wherein the side association is a first side association associated with a first time, and wherein the method further comprises: determining a second side association, wherein the second side association is associated with a second time after the first time, wherein determining the second side association comprises: determining, based at least in part on a time difference between the first time and the second time, that the second side association is a same side association as the first side association.

N. One or more non transitory computer readable media storing instructions executable by a processor, wherein the instructions, when executed, cause the processor to perform operations comprising: receiving sensor data associated with an environment; determining, based at least in part on the sensor data, a region in the environment; determining a first cost associated with a vehicle passing the region on a first side of the region; determining a second cost associated with the vehicle passing the region on a second side of the region; determining, based at least in part on the first cost and the second cost, and as a side association, an indication whether to traverse passed the region on the first side or the second side; determining, based at least in part on side association, a planning corridor; determining, based at least in part on the planning corridor, a trajectory for the vehicle; and controlling the vehicle in the environment based at least in part on the trajectory.

O. The one or more non transitory computer readable media of paragraph N, wherein determining the trajectory is further based at least in part on a desired ending state of the vehicle, and wherein determining at least one of the first cost or the second cost is based at least in part on whether the desired ending state of the vehicle is a terminal state or a non-terminal state.

P. The one or more non transitory computer readable media of paragraph N, the operations further comprising: determining that a desired ending state of the vehicle is a terminal state, wherein determining at least one of the first cost or the second cost is based at least in part on a cost plot, wherein the cost plot includes a set of values associated with moving the vehicle from a range of positions and orientations to a target range and target orientation.

Q. The one or more non transitory computer readable media of paragraph N, wherein determining at least one of the first cost or the second cost is based at least in part on at least one of: a kinematic cost; a path length cost; a travel time cost; an acceleration cost; a proximity cost; or a path confidence cost.

R. The one or more non transitory computer readable media of paragraph N, wherein determining the first cost comprises: determining, based at least in part on the sensor data, a data structure indicating occupied and unoccupied space in the environment; determining a route associated with the vehicle, the route including a starting state of the vehicle and a desired ending state of the vehicle; determining, based at least in part on the route, a first grid comprising one or more layers disposed at intervals along the route and defining a plurality of nodes associated with different locations in the environment; determining, based at least in part on the data structure, a first subset of nodes associated with a first candidate path; and determining, based at least in part on the first subset of nodes, the first cost.

S. The one or more non transitory computer readable media of paragraph R, wherein determining the first subset of nodes comprises: determining a first set of candidate actions for controlling motion of the vehicle; determining a first candidate action of the first set of candidate actions, based at least in part on a first candidate action cost associated with the first candidate action; determining a predicted first vehicle state associated with the first candidate action; determining a second set of candidate actions for controlling motion of the vehicle from the predicted first vehicle state; determining a second candidate action of the second set of candidate actions, based at least in part on a second candidate action cost associated with the second candidate action; and determining a predicted second vehicle state associated with the second candidate action.

T. The one or more non transitory computer readable media of paragraph N, wherein the planning corridor is an updated planning corridor, and wherein determining the updated planning corridor comprises: receiving an initial planning corridor associated with the vehicle; and determining, as the updated planning corridor, a portion of the planning corridor exclusive of the region and exclusive of an area of the initial planning corridor between the region and one side of the initial planning corridor.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processors; and
one or more computer-readable media storing computer-executable instructions that, when executed, cause the one or more processors to perform operations comprising:

receiving an initial planning corridor indicative of a region in an environment through which a vehicle is constrained to drive;

receiving sensor data;

determining, based at least in part on the sensor data, an object at least partially blocking a portion of the initial planning corridor;

determining a first path between a starting vehicle state and a desired ending vehicle state passing on a first side of the object;

determining whether the desired ending vehicle state is a terminal state or a non-terminal state;

determining a first cost associated with the first path based at least in part on whether the desired ending vehicle state is a terminal state or a non-terminal state;

determining a second path between the starting vehicle state and the desired ending vehicle state passing on a second side of the object;

determining a second cost associated with the second path based at least in part on whether the desired ending vehicle state is a terminal state or a non-terminal state;

determining, based at least in part on the first cost and the second cost, a side association indicative of whether to pass on the first side or the second side of the object;

determining, based at least in part on the sensor data, the side association, and the initial planning corridor, an updated planning corridor;

determining, within the updated planning corridor, a trajectory for the vehicle; and controlling the vehicle within the environment based at least in part on the trajectory.

2. The system of claim 1, wherein the desired ending vehicle state is a terminal vehicle state, and
wherein determining at least one of the first cost or the second cost comprises referencing a value associated with a cost plot based at least in part on a current vehicle state and the terminal vehicle state.

3. The system of claim 1, wherein at least one of the first cost or the second cost comprises one or more of:
a kinematic cost;
a path length cost;
a travel time cost;
an acceleration cost;
a proximity cost; or
a path confidence cost.

4. The system of claim 1, wherein determining the first path comprises:
determining a grid comprising one or more layers disposed at intervals and defining a plurality of nodes associated with different locations in the environment; and
determining, based at least in part on the grid, a first subset of nodes associated with the first path.

5. The system of claim 1, wherein:
determining that the desired ending vehicle state is a terminal state is associated with applying a first set of costs to evaluate the first path or the second path, and
determining the desired ending vehicle state is a non-terminal state is associated with applying a second set of costs different than the first set of costs to evaluate the first path or the second path.

6. The system of claim 1, wherein the terminal state comprises a location in the environment where the vehicle intends to stop and the non-terminal state comprises a location in the environment where the vehicle intends to drive through as a continuing point to another location.

7. The system of claim 1, the operations further comprising:
determining an object type of the object, and
wherein determining at least one of the first cost or the second cost is based at least in part on the object type.

8. A method comprising:
receiving sensor data associated with a vehicle in an environment;

determining, based at least in part on the sensor data, a region in the environment;

determining a desired ending state of the vehicle, wherein the desired ending state is a terminal state or a non-terminal state;

determining a first cost associated with the vehicle passing the region on a first side of the region based at least in part on whether the desired ending state of the vehicle is a terminal state or a non-terminal state;

determining a second cost associated with the vehicle passing the region on a second side of the region based at least in part on whether the desired ending state of the vehicle is a terminal state or a non-terminal state;

determining, based at least in part on the first cost and the second cost, and as a side association, an indication whether to traverse passed the region on the first side or the second side;

determining, based at least in part on side association, a planning corridor;

determining, based at least in part on the planning corridor, a trajectory for the vehicle; and controlling the vehicle in the environment based at least in part on the trajectory.

9. The method of claim 8, further comprising:
determining that the desired ending state of the vehicle is a terminal state,
wherein determining at least one of the first cost or the second cost is based at least in part on a cost plot, wherein the cost plot includes a set of values associated with moving the vehicle from a range of positions and orientations to a target range and target orientation.

10. The method of claim 8, wherein determining at least one of the first cost or the second cost is based at least in part on at least one of:
a kinematic cost;
a path length cost;
a travel time cost;
an acceleration cost;
a proximity cost; or
a path confidence cost.

11. The method of claim 8, wherein determining the first cost comprises:
determining, based at least in part on the sensor data, a data structure indicating occupied and unoccupied space in the environment;
determining a route associated with the vehicle, the route including a starting state of the vehicle and the desired ending state of the vehicle;
determining, based at least in part on the route, a first grid comprising one or more layers disposed at intervals along the route and defining a plurality of nodes associated with different locations in the environment;
determining, based at least in part on the data structure, a first subset of nodes associated with a first candidate path; and
determining, based at least in part on the first subset of nodes, the first cost.

12. The method of claim 11, wherein determining the first subset of nodes comprises:
- determining a first set of candidate actions for controlling motion of the vehicle;
- determining a first candidate action of the first set of candidate actions, based at least in part on a first candidate action cost associated with the first candidate action;
- determining a predicted first vehicle state associated with the first candidate action;
- determining a second set of candidate actions for controlling motion of the vehicle from the predicted first vehicle state;
- determining a second candidate action of the second set of candidate actions, based at least in part on a second candidate action cost associated with the second candidate action; and
- determining a predicted second vehicle state associated with the second candidate action.

13. The method of claim 8, wherein the planning corridor is an updated planning corridor, and wherein determining the updated planning corridor comprises:
- receiving an initial planning corridor associated with the vehicle; and
- determining, as the updated planning corridor, a portion of the planning corridor exclusive of the region and exclusive of an area of the initial planning corridor between the region and one side of the initial planning corridor.

14. The method of claim 8, wherein the side association is a first side association associated with a first time, and wherein the method further comprises:
- determining a second side association, wherein the second side association is associated with a second time after the first time, wherein determining the second side association comprises:
  - determining, based at least in part on a time difference between the first time and the second time, that the second side association is a same side association as the first side association.

15. One or more non-transitory computer-readable media storing instructions executable by a processor, wherein the instructions, when executed, cause the processor to perform operations comprising:
- receiving sensor data associated with a vehicle in an environment;
- determining, based at least in part on the sensor data, a region in the environment;
- determining a desired ending state of the vehicle, wherein the desired ending state is a terminal state or a non-terminal state;
- determining a first cost associated with the vehicle passing the region on a first side of the region based at least in part on whether the desired ending state of the vehicle is a terminal state or a non-terminal state;
- determining a second cost associated with the vehicle passing the region on a second side of the region based at least in part on whether the desired ending state of the vehicle is a terminal state or a non-terminal state;
- determining, based at least in part on the first cost and the second cost, and as a side association, an indication whether to traverse passed the region on the first side or the second side;
- determining, based at least in part on the side association, a planning corridor;
- determining, based at least in part on the planning corridor, a trajectory for the vehicle; and
- controlling the vehicle in the environment based at least in part on the trajectory.

16. The one or more non-transitory computer-readable media of claim 15, the operations further comprising:
- determining that the desired ending state of the vehicle is a terminal state,
- wherein determining at least one of the first cost or the second cost is based at least in part on a cost plot, wherein the cost plot includes a set of values associated with moving the vehicle from a range of positions and orientations to a target range and target orientation.

17. The one or more non-transitory computer-readable media of claim 15, wherein determining at least one of the first cost or the second cost is based at least in part on at least one of:
- a kinematic cost;
- a path length cost;
- a travel time cost;
- an acceleration cost;
- a proximity cost; or
- a path confidence cost.

18. The one or more non-transitory computer-readable media of claim 15, wherein determining the first cost comprises:
- determining, based at least in part on the sensor data, a data structure indicating occupied and unoccupied space in the environment;
- determining a route associated with the vehicle, the route including a starting state of the vehicle and the desired ending state of the vehicle;
- determining, based at least in part on the route, a first grid comprising one or more layers disposed at intervals along the route and defining a plurality of nodes associated with different locations in the environment;
- determining, based at least in part on the data structure, a first subset of nodes associated with a first candidate path; and
- determining, based at least in part on the first subset of nodes, the first cost.

19. The one or more non-transitory computer-readable media of claim 18, wherein determining the first subset of nodes comprises:
- determining a first set of candidate actions for controlling motion of the vehicle;
- determining a first candidate action of the first set of candidate actions, based at least in part on a first candidate action cost associated with the first candidate action;
- determining a predicted first vehicle state associated with the first candidate action;
- determining a second set of candidate actions for controlling motion of the vehicle from the predicted first vehicle state;
- determining a second candidate action of the second set of candidate actions, based at least in part on a second candidate action cost associated with the second candidate action; and
- determining a predicted second vehicle state associated with the second candidate action.

20. The one or more non-transitory computer-readable media of claim 15, wherein the planning corridor is an updated planning corridor, and wherein determining the updated planning corridor comprises:
- receiving an initial planning corridor associated with the vehicle; and
- determining, as the updated planning corridor, a portion of the planning corridor exclusive of the region and exclusive of an area of the initial planning corridor between the region and one side of the initial planning corridor.

* * * * *